(12) United States Patent
Kurita

(10) Patent No.: US 6,206,164 B1
(45) Date of Patent: Mar. 27, 2001

(54) DUAL-MODE TWO-WAY CLUTCH

(75) Inventor: Masahiro Kurita, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/537,567

(22) Filed: Mar. 30, 2000

Related U.S. Application Data

(62) Division of application No. 09/219,792, filed on Dec. 23, 1998, now Pat. No. 6,068,097.

(30) Foreign Application Priority Data

| Dec. 24, 1997 | (JP) | ..................................................... 9-354944 |
| Dec. 24, 1997 | (JP) | ..................................................... 9-354945 |
| Dec. 24, 1997 | (JP) | ..................................................... 9-354946 |

(51) Int. Cl.⁷ ............................ F16D 41/02; F16D 15/00
(52) U.S. Cl. ........................ 192/223.2; 192/38; 297/353; 297/378.12
(58) Field of Search .................................. 192/223.2, 27, 192/38; 188/342; 74/531; 297/353, 374, 361.1, 378.12, 378.1

(56) References Cited

U.S. PATENT DOCUMENTS

| 2,171,458 |   | 8/1939  | Swartz . |   |
|-----------|---|---------|----------|---|
| 2,583,428 |   | 1/1952  | Houplain . |   |
| 2,597,798 |   | 5/1952  | Houplain . |   |
| 2,624,396 |   | 1/1953  | Spraragen . |   |
| 3,240,300 |   | 3/1966  | McKay . |   |
| 3,476,226 |   | 11/1969 | Massey . |   |
| 3,523,593 |   | 8/1970  | Karasick . |   |
| 5,307,911 | * | 5/1994  | Robinson ........................... | 192/38 X |
| 5,443,147 |   | 8/1995  | Gratzer . |   |
| 5,460,253 |   | 10/1995 | Ritter et al. . |   |
| 5,522,488 | * | 6/1996  | Schwarzbich ...................... | 192/223.2 |
| 5,593,210 | * | 1/1997  | Schwarzbich ...................... | 297/361.1 |
| 5,788,021 | * | 8/1998  | Tsai ............................... | 192/223.2 X |
| 5,794,479 | * | 8/1998  | Schwarzbich ................. | 192/223.2 X |
| 5,896,973 | * | 4/1999  | Hochmuth et al. ............... | 192/223.2 |

* cited by examiner

*Primary Examiner*—Rodney H. Bonck
(74) *Attorney, Agent, or Firm*—Sughrue, Mion, Zinn, Macpeak & Seas, PLLC

(57) ABSTRACT

A novel dual-mode two-way clutch is provided which is capable of locking two relatively rotatable members from being rotated in any one of first and second directions opposite to each other, but which when an external force is applied, the clutch is in position to allow the rotatable members to rotate relative to each other in any one of the first and second directions. This dual-mode two-way clutch includes generally V-shaped cam faces 6 defined in an outer peripheral surface of an inner race 1 and a circumferentially extending raceway 2a defined in an inner peripheral surface of an outer race 2. A plurality of rolling elements 3 are interposed between the cam faces 6 and the raceway 2a in frictional engagement therewith for locking the relative rotation of the inner and outer races 1 and 2. When each of the rolling elements 3 is held in the corresponding cam face 6 at a location intermediate thereof, gaps are formed between the rolling elements 3 and the outer race 2 or cam faces 6 in a radial direction. The rolling elements 3 are retained in respective pockets defined in a retainer 4. Engagement projections 9 and retainer fixing grooves 7 which are loosely engageable with each other are formed in the retainer 4 and the inner race 1, respectively. When the retainer 4 is urged towards the inner race 1 by the application of an external force F, the projections 9 and the grooves 7 are tightly engaged with each other to lock the retainer 4 to the inner race 1 so as to cause the rolling elements 3 to be positioned at a location intermediate of the respective cam faces 6.

9 Claims, 19 Drawing Sheets

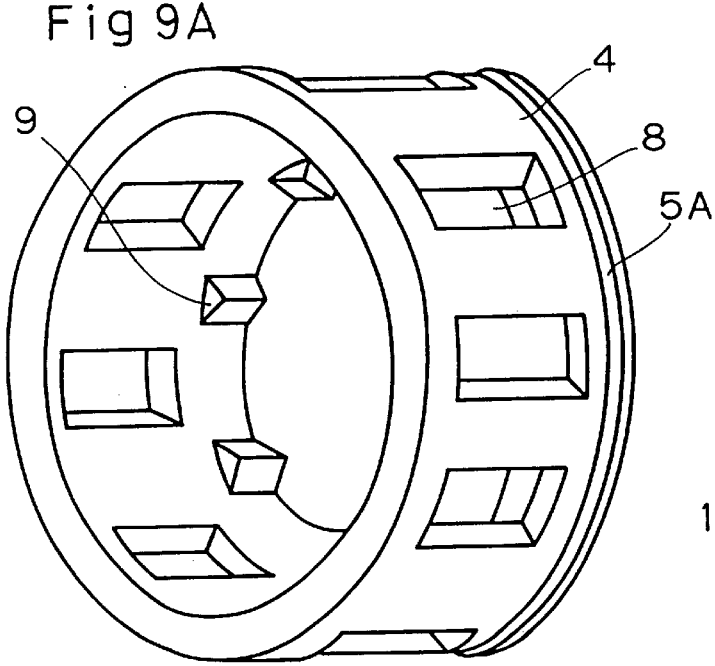
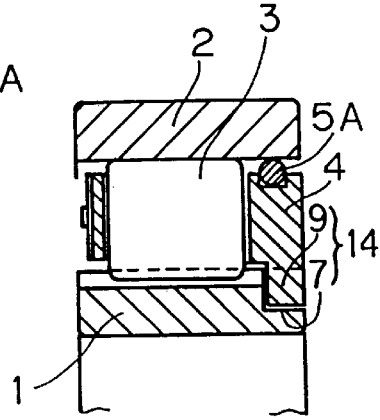
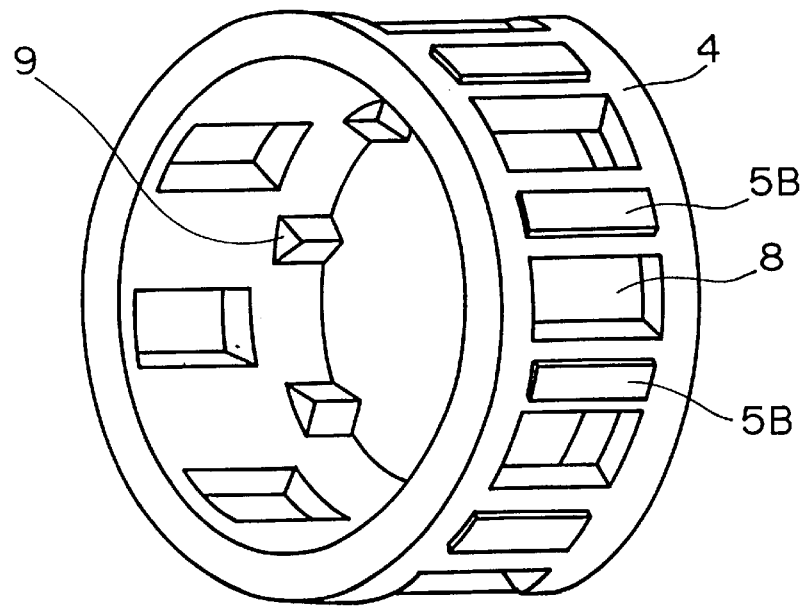

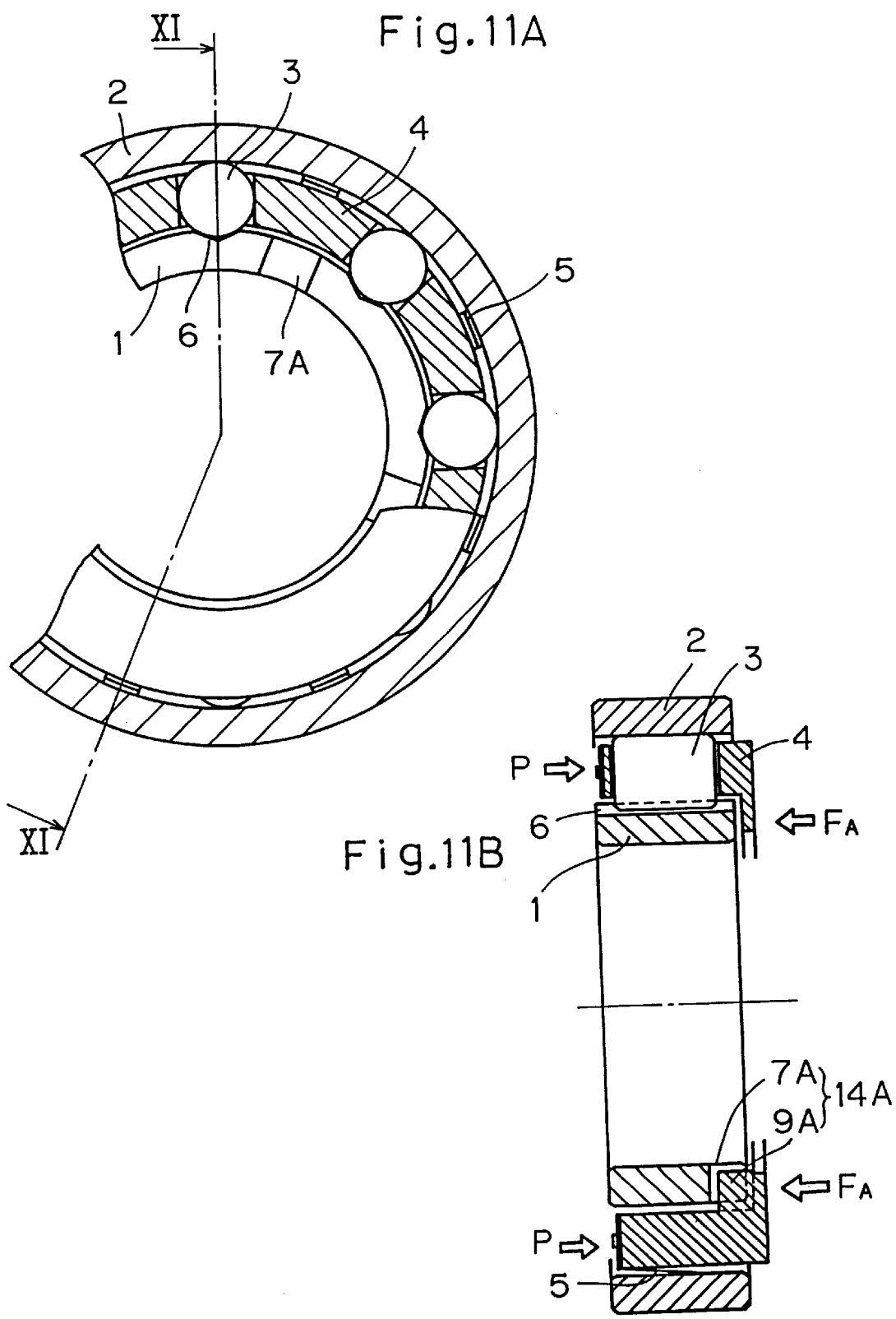

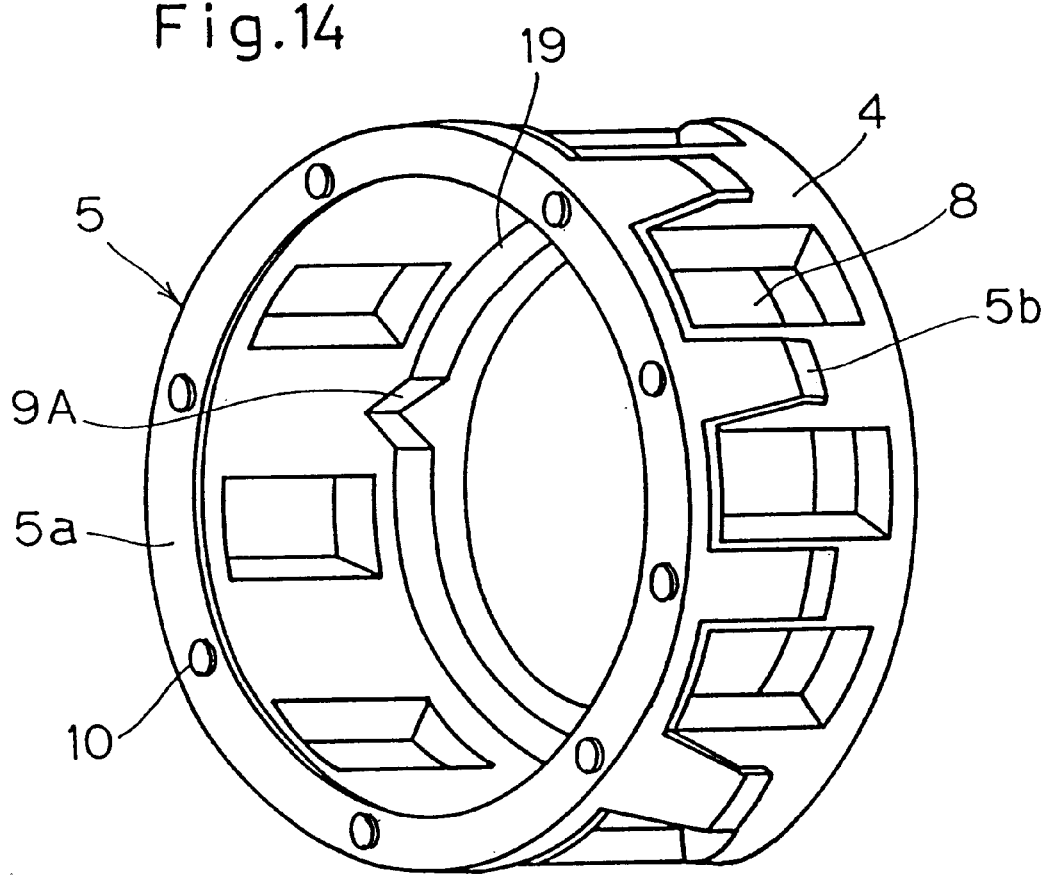

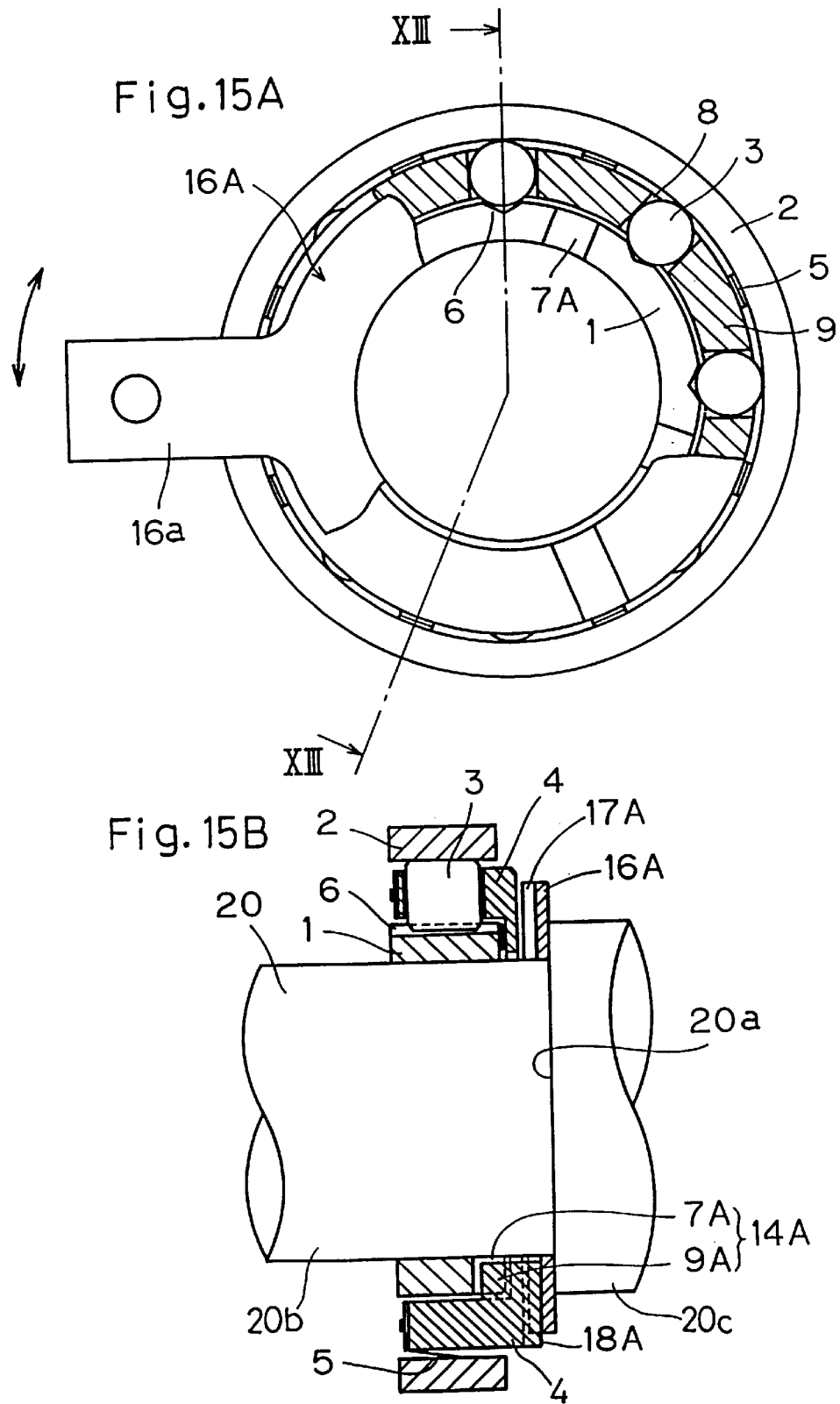

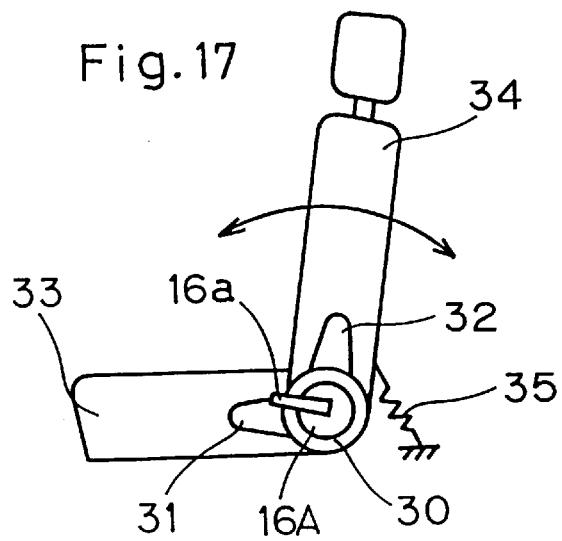
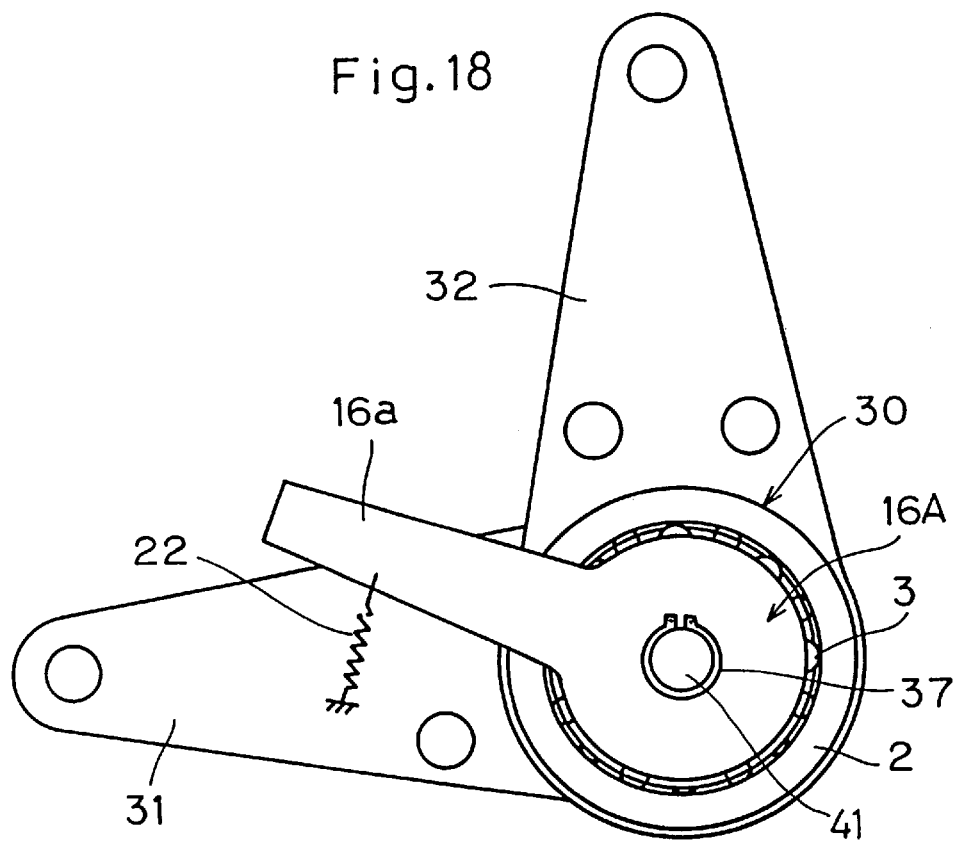

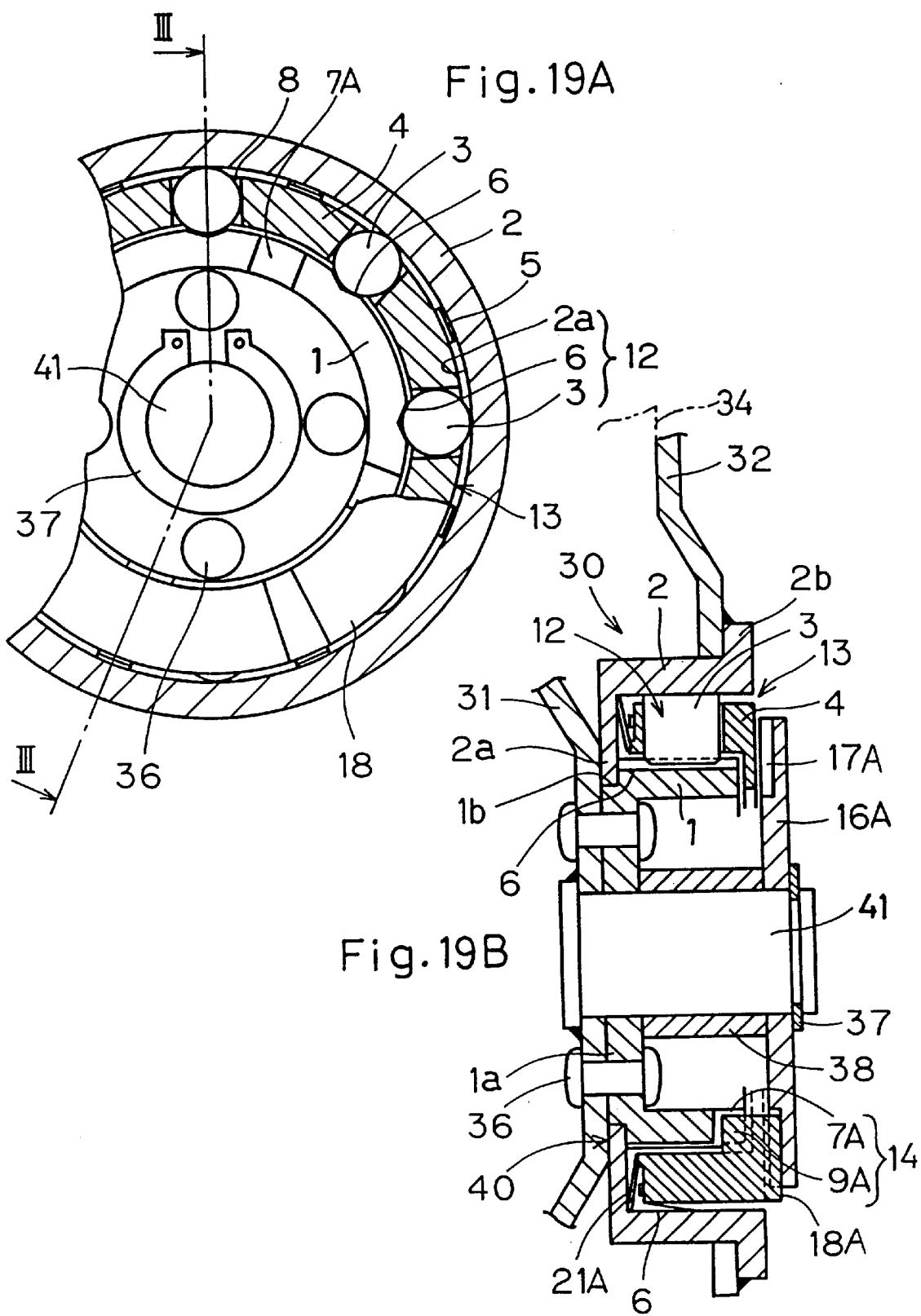

DUAL-MODE TWO-WAY CLUTCH

This is a divisional of application Ser. No. 09/219,792 filed Dec. 23, 1998, now U.S. Pat. No. 6,068,097, the disclosure of which is incorporated herein by reference.

BACKGROUND OF THE INVENTION

1. (Field of the Invention)

The present invention generally relates to a two-way clutch and, more particularly, to a dual-mode two-way clutch that can be used in a physical mechanism wherein mechanical component parts although incapable of freely rotating in any one of first and second directions opposite to each other under a normal condition can be rendered freely rotatable in any one of the first and second directions when the necessity arises. The present invention also relates to an automobile seat back adjustment and a bearing, both having the dual-mode two-way clutch incorporated therein and

2. (Description of the Prior Art)

Wheels used in, for example, a cart or sliding door can, unless forcibly halted by any means, rotate along a slope under the influence of a horizontal component of force and/or an inertia force. For this reason, depending on the application, it is a current practice to use a brake mechanism to apply an external force to at least one of the wheels to halt it to thereby secure a safety factor.

FIG. 28 illustrates an exemplary construction of a one-way clutch well known to those skilled in the art. The one-way clutch shown therein comprises a shaft 81, an outer race 82, a plurality of rollers 83, a retainer 84 and a plurality of springs 85. The outer race 82 has an inner peripheral surface formed with inclined cam faces 86 equal in number to the number of the rollers 83, and the springs 85 are used to urge the associated rollers 83 towards respective narrow regions of the cam faces 86 so that when and so long as the shaft 81 is locked in position, the outer race 82 is inhibited from rotating in a clockwise direction as viewed therein.

An exemplary construction of a two-way clutch known to those skilled in the art is shown in FIG. 29. This two-way clutch shown therein comprises a shaft 91, an outer race 92 positioned radially outwardly of the shaft 91 and a plurality of rollers 93 interposed between the shaft 91 and the 92. The structure so far described is substantially similar to the one-way clutch, but the two-way clutch is generally characterized in that the outer race 92 has its inner peripheral surface formed with two mutually opposed cam faces 97 for each of the rollers 93, in that two springs 95 and 96 are positioned on respective sides of each of the rollers 93 and in that a means, for example, a lever 98 in the illustrated example, is provided to displace a retainer 94 in a direction circumferentially of the shaft 91. This exemplary two-way clutch shown in FIG. 29 has a function of switching a direction in which the outer race 92 is locked in one of clockwise and counterclockwise directions by causing a circumferential displacement of the retainer 94 to bring each of the rollers 93 to a position engageable with one of the respective cam faces 97.

As the nomenclature indicates, the one-way clutch can lock rotation in one direction. On the contrary, the two-way clutch although having a function of locking selectively in one of the clockwise and counterclockwise directions depending on manipulation of the lever or the like, has no function of locking rotation in both directions. Accordingly, the both cannot be effectively utilized in association with the wheels of the cart or the sliding door which requires a high safety factor.

When it comes to a manually adjustable reclining seat assembly currently employed in automotive vehicles, the mainstream is the use of a ratchet mechanism, although some of the manually adjustable reclining seat assemblies make use of a planetary gear mechanism, for adjustably repositioning the seat back relative to the seat. However, the use of the ratchet mechanism permits the seat back to be adjustable stepwise relative to the seat and has therefore been found posing a problem associated with the convenience to use. The use of the ratchet mechanism has an additional problem in that when the seat back is folded down or erected relative to the seat, obnoxious sounds tend to be generated as a result of incomplete engagement of toothed component parts.

On the other hand, although the planetary gear mechanism permits the seat back to be continuously adjusted relative to the seat, not only can the seat back adjustment be manipulated in a one-touch fashion, but the structure is complicated enough to make the planetary gear mechanism expensive and costly.

In either case, the conventionally utilized seat back adjustment for automobile use generally has a problem in that if the seat back is excessively folded down or erected, the seat back must be repositioned by manipulating an adjustment lever, involving an insufficient operativity.

SUMMARY OF THE INVENTION

Accordingly, the present invention has been devised with a view to substantially eliminating the above discussed problems inherent in the prior art clutches and has for its object to provide a novel duel-mode two-way clutch capable of locking in any one of forward and reverse directions opposite to each other and also capable of permitting rotation in any one of the forward and reverse directions when manipulated externally.

An additional object of the present invention is to provide an improved seat back adjustment for use in a reclining seat assembly, wherein the angle of inclination of the seat back relative to the seat is adjustable indefinitely between the folded and erected positions, wherein selection of one of two opposite directions in which the seat back is folded and erected can be accomplished freely, and which is simple in structure and capable of exhibiting an improved operativity.

A further object of the present invention is to provide an improved bearing assembly having built therein the dual-mode two-way clutch of the type referred to above.

In order to accomplish this object, the present invention provides a dual-mode two-way clutch which comprises a first member and a second member which are rotatable relative to each other in any one of first and second directions opposite to each other, a locking means normally locking rotation of the first and second members relative to each other in any one of the first and second directions, and a lock release means operable when an external force is applied thereto to disable the locking means to permit the first and second members to rotate relative to each other.

It is to be noted that the terms "first member" and "second member" are intended to means respective members rotatable relative to each other and, therefore, one of the first and second members may be fixed in position with respect to the axis of rotation thereof.

According to the present invention, the first and second members are normally locked in position together so as not to rotate relative to each other, that is, inhibited from rotating relative to each other. However, when the predetermined external force is applied to the lock release means, the locking function of the locking means are disabled and, therefore, the first and second members are permitted to rotate relative to each other in any one of the forward and reverse directions opposite to each other.

The locking means and the lock release means may take, for example, the following construction. Specifically, the locking means may comprises a circumferentially extending raceway defined in at least one of the first and second members about an axis of rotation thereof, a plurality of circumferentially spaced cam faces defined in the other of the first and second members at a location facing the circumferentially extending raceway in said one of the first and second members, and a plurality of engagement elements interposed between the circumferentially extending raceway and the cam faces and frictionally engaged with the circumferentially extending raceway and the cam faces. The engagement elements are operable to lock rotation of the first and second members relative to each other in any one of the first and second directions. The cam faces are disengaged from the frictional engagement with the engagement elements when each of the engagement elements is retained at a neutral position in the corresponding cam face;

On the other hand, the lock release means may comprise a retainer of the following construction and a guide means. The retainer serves to retain the engagement elements in a fashion non-displaceable in a direction conforming to the direction of relative rotation of the first and second members. The guide means is operable to guide the retainer in the direction conforming to the direction of relative rotation of the first and second members to thereby constrain the retainer relative to any one of the first and second members when a predetermined external force is applied to the retainer, whereby each of the engagement element is brought to the neutral position in the corresponding cam face.

Where the locking means and the lock release means are so constructed as hereinabove described, the engagement element normally frictionally engages the circumferentially extending race way of such one of the first and second members and the cam faces in the other of the first and second members to lock-the first and second members to thereby inhibit the first member from rotating relative to the second member in any one of the forward and reverse directions. At this time, each of the engagement elements is held at a position displaced from the neutral position in one of opposite directions. However, when the external force is applied to the retainer, the retainer is moved a slight distance having beers guided by the guide means, bringing the engagement elements to the neutral position in the cam faces. The cam faces are disengaged from the frictional contact with the rolling elements when the latter are brought to the neutral position, thereby permitting the first and second members to rotate relative to each other in any one of the forward and reverse directions. In other words, the dual-mode two-way clutch of the present invention has a novel function, not hitherto found in the prior art clutches, wherein the clutch is effective to retain a locking condition in any one of the forward and reverse directions, but when manipulated externally, attains a function of permitting the first and second members to rotate relative to each other in any one of the forward and revere directions.

In this dual-mode two-way clutch of the structure described above, the following construction may be available. Specifically, the first and second members may be positioned radially inwardly and outwardly with respect to the axis of rotation thereof, respectively, and the circumferentially extending raceway and the cam faces face with each other in a radial direction of the first and second members with said cam faces defined at respective locations spaced in a direction circumferentially of such one of the first and second members. In such case, the engagement elements comprise a rolling elements employed for each of the cam faces, and each of the cam faces is formed to have a maximum depth at a position intermediate thereof while the depth of the respective cam face is progressively reducing on both sides thereof The neutral position referred to above is represented by the position intermediate of each of the cam faces, and when the rolling elements are held at the neutral position a slight radial gap is formed between the circumferentially extending raceway or the cam faces and the associated rolling elements.

In the case of the above described construction, when the first and second members undergo slight relative rotation in any one of the forward and reverse directions, the rolling elements which serves the engagement elements normally move within the respective cam faces from the neutral position towards to a position slightly displaced from the neutral position to establish the frictional contact with the cam faces and the circumferentially extending raceway to thereby inhibit the rolling elements from rotating further. In the event that the first and second members rotate in a direction reverse to that described above, the rolling elements moves from the neutral position in the respective cam faces to a position displaced in a direction reverse to that described above to thereby inhibit the rolling element from rotating further. When the predetermined external force is applied to the retainer, the retainer is moved a slight distance having been guided by the guide means to cause the rolling elements, retained thereby, to position at the neutral position where each of the cam faces has a maximum depth. For this reason, locking of rotation in any one of the forward and reverse directions can be released simultaneously.

In this dual-mode two-way clutch of the structure described above, the following construction may be available. Specifically, the guide means may comprises a plurality of retainer fixing grooves defined in one of the first or second member in which the cam faces are formed and the retainer, and a corresponding number of engagement projections defined in the other of the first or second member and the retainer, said engagement projections being loosely engaged in the respective retainer fixing grooves so long as no predetermined external force is applied to the retainer, but tightly engaged in the respective retainer fixing grooves when the predetermined external force is applied to the retainer. At least one elastic member for applying a frictional force acting in the rotation direction between the retainer and the second or first member where the circumferentially extending raceway is formed may be employed.

According to the above described construction, the retainer fixing grooves and the engagement projections are not tightly engaged with each other and, therefore, the retainer and one of the first and second members where the cam faces are formed are rotatable relative to each other an angular distance determined within the range of looseness between the retainer fixing grooves and the engagement projections. For this reason, there is no function in which the rolling elements are retained at the neutral position of the cam faces by the retainer and rotation of the first and second members in any one of the opposite directions is locked by the frictional engagement exhibited by the rolling elements. When, however, the external force is applied to the retainer, the retainer fixing grooves and the engagement projections are tightly engaged with each other with the retainer consequently constrained by one of the first and second members where the cam faces are formed, resulting in that the rolling elements held thereby are retained in the neutral position. Accordingly, the first and second members can rotate in any one of the opposite directions. The elastic member is utilized to cause the retainer to be rotated in accompaniment with the rotation of one of the first and second members where the circumferentially extending raceway is defined, so that when the locking is desired again by removing the external force that has been applied to the retainer, the rolling elements can be displaced by the rotation of the retainer to a shallow position in the cam faces. By the provision of the elastic member, the dual-mode two-way clutch can assuredly bring about locking.

In the construction described above, the retainer fixing grooves and the engagement projections may be so designed as to be engageable with each other in a radial direction of any one of the first and second members, in which case the retainer should be made of a material elastically deformable by the predetermined external force applied thereto. The dual-mode two-way clutch so constructed may additionally comprises an operating member rotatable coaxially with any one of the first and second members, and operating cam faces defined in the operating member and the retainer for applying a radially acting force, which serves the predetermined external force, to the retainer as the operating member is turned.

In such case, when the operating member is turned from the rotation locking condition, the radially acting external force is applied to the retainer by means of the operating cam faces to cause the retainer to undergo an elastic deformation, resulting in the engagement projections tightly engaged in the associated retainer fixing grooves. Accordingly, as hereinbefore described, the rolling elements can be retained at the neutral position, permitting the first and second members to be rotatable relative to each other in any one of the opposite directions.

Alternatively, the retainer fixing grooves and the engagement projections may be so designed as to be engageable with each other in an axial direction of any one of the first and second members. In such case, the dual-mode two-way clutch may also comprises an operating member rotatable disposed in face-to-face relation to an end face of the retainer for rotation coaxially with any one of the first and second members, and operating cam faces defined in the operating member and the retainer for applying an axially acting force, which serves the predetermined external force, to the retainer as the operating member is turned.

In this case, when the operating member is turned from the rotation locking condition, the axially acting external force is applied to the retainer by means of the operating cam faces to cause engagement projections to be tightly engaged in the associated retainer fixing grooves. Accordingly, as hereinbefore described, the rolling elements can be retained at the neutral position, permitting the first and second members to be rotatable relative to each other in any one of the opposite directions.

Preferably, the dual-mode two-way clutch of the present invention may comprise a return elastic member for urging the operating member in a direction away from the retainer.

The present invention also provides a seat back adjustment for a seat assembly including a seat and a seat back coupled with the seat and tiltable between folded and erected positions relative to the seat. The seat back adjustment comprises fixed and movable frames adapted to be rigidly secured to the seat and seat back, respectively, and a clutch including an inner race and an outer race both rotatable relative to each other in any one of first and second directions opposite to each other, one of the inner and outer races being fixedly connected to the fixed frame and the other of the inner and outer races being fixedly connected to the movable frame. The clutch also including a lock means for locking the relative rotation of the inner and outer races in any one of the first and second directions by means of a frictional contact, a lock release means for releasing the lock means to allow the inner and outer races to be rotatable in any one of the first and second directions relative to each other when a predetermined external force is applied thereto, and an operating member for applying the external force.

With this seat back adjustment, the inner race and the outer race are locked by the lock means to render them to be incapable of rotating relative to each other. However, when the predetermined external force is applied to the lock release means through the operating member, the lock means is released to permit the inner race and the outer race to be rotatable relative to each other in any one of the first and second directions opposite to each other. For this reason, the seat back can be adjusted to any desired tilt angle between the folded and erected positions relative to the seat. Also, since the locking takes place by the utilization of the frictional contact, the seat back can be adjusted indefinitely between the folded and erected positions. Adjustment of the seat back towards the folded position and also towards the erected position can also be accomplished easily with a simplified structure.

The lock means and the lock release means both used in the seat back adjustment can be of a structure substantially identical with those employed in the previously discussed dual-mode two-way clutch.

In one embodiment of the present invention, the inner race may be fixed to the fixed frame, in which case the outer race is fixed to the movable frame. For this purpose, the fixed frame has a stud shaft fixed thereto in coaxial relation with the outer race and, on the other hand, the operating member is rotatably supported by the stud shaft in coaxial relation with the inner race with the engagement projections engageable in the retainer fixing grooves. Operating cam faces are defined in the operating member and the retainer for applying an axially acting force, which serve the predetermined external force, to the retainer as the operating member is turned.

Also, each of the lock means and the lock release means may take the following structure. Specifically, the lock means may comprise a plurality of rocking sprags provided in one of the outer peripheral surface of the inner race and the inner peripheral surface of the outer race for rocking motion in a direction circumferentially of any one of the inner and outer races, and a cylindrical sprag contact surface defined in the other of the outer peripheral surface of the inner race and the inner peripheral surface of the outer race. In this structure, the sprags are, when held at a neutral angle, disengaged from the sprag contact surface to permit the relative rotation between the inner and outer races, but the sprags are, when tilted in either direction circumferentially of any one of the inner and outer races, frictionally engaged with the sprag contact surface to lock the relative rotation between the inner and outer races. In this case, the lock release means is operable to selectively positioning the sprags between a first position, in which the sprags assume the neutral angle, and a second position in which the sprags are free to tilt.

Where the lock means and the lock release means are so constructed as hereinabove described, unless the angle of the sprags is retained by the lock release means, the sprags can tile laterally in either direction circumferentially of any one of the inner and outer races. However, when the relative rotation between the inner and outer races takes place, the sprags are tilted in one of the opposite directions conforming to the direction of the relative rotation to thereby frictionally engage the sprag contact surface formed in the inner race or the outer race. For this reason, the relative rotation of the inner and outer races is thus locked. Accordingly, the seat back can be repositioned to a position corresponding to the selected tilt angle. On the other hand, if the sprags are held at the neutral position by the lock release means, the sprags are disengaged from the sprag contact surface, permitting the inner race and the outer race to be rotatable relative to each other in any one of the first and second directions opposite to each other.

Furthermore, the present invention provides a bearing assembly equipped with a clutch, which comprises a rolling bearing comprising an inner race, an outer race and a plurality of rolling elements interposed between the inner race and the outer race, and a clutch having component parts constituted by the inner race and the outer race and including a lock means for locking the relative rotation of the inner and outer races in any one of first and second directions opposite to each other by means of a frictional contact, and a lock release means for releasing the lock means to allow the inner and outer races to be rotatable in any one of the first and second directions relative to each other when a predetermined external force is applied thereto.

In this bearing assembly equipped with the clutch, both of a function as a rolling bearing and a function as a clutch can be appreciated two in one. In other words, the inner race and the outer race are locked by the lock means to render them to be incapable of rotating relative to each other. However, when the predetermined external force is applied to the lock release means through the operating member, the lock means is released to permit the inner race and the outer race to be rotatable relative to each other in any one of the first and second directions opposite to each other. Also, a portion of the bearing assembly functioning as the rolling bearing and another portion of the bearing assembly functioning as the clutch make use of the single inner race and the single outer race, the bearing assembly as a whole can be assembled so compact in size as to require a relatively small space for installation and the number of component parts forming the bearing assembly can also be reduced.

The lock means and the lock release means both used in the bearing assembly equipped with the clutch can be of a structure substantially identical with those employed in the previously discussed dual-mode two-way clutch.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 9A is a perspective view of a modified form of the retainer provided with the elastic member;

FIG. 9B is a fragmentary transverse sectional view, on an enlarged scale, of the retainer of FIG. 9A shown together with the inner and outer races;

FIG. 10 is a perspective view showing a further modified form of the retainer provided with the elastic member;

FIG. 11A is a fragmentary transverse sectional view of the dual-mode two-way clutch according to a second preferred embodiment of the present invention;

FIG. 11B is a cross-sectional view taken along the line XI—XI in FIG. 11A;

FIG. 14 is a perspective view of the retainer used in the dual-mode two-way clutch, shown together with the elastic member fitted thereto;

FIG. 15A is a transverse sectional view, with a portion broken away, of the dual-mode two-way clutch according to a third preferred embodiment of the present invention;

FIG. 15B is a cross-sectional view taken along the line XIII—XIII in FIG. 15A;

FIG. 17 is a schematic side view of a reclining seat assembly having a seat back adjusting mechanism according to a fourth preferred embodiment of the present invention;

FIG. 18 is a schematic side view, on an enlarged scale, showing the seat back adjusting mechanism shown in FIG. 17;

FIG. 19A is a fragmentary transverse sectional view, with a portion cut away, of the seat back adjusting mechanism shown in FIG. 17;

FIG. 19B is a cross-sectional view taken along the line III—III in FIG. 19A;

DETAILED DESCRIPTION OF THE EMBODIMENTS

Figure 1:
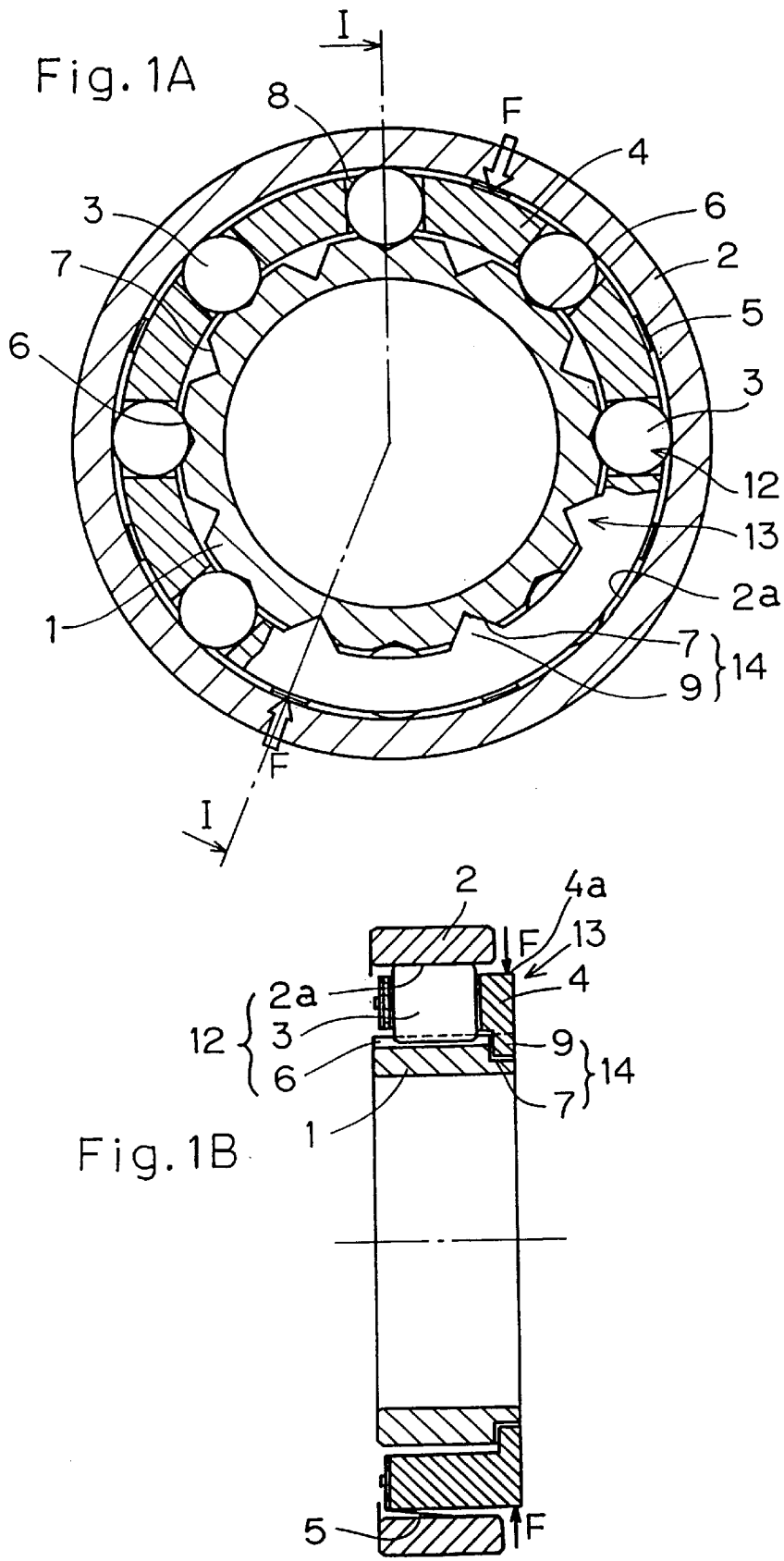
FIG. 1A is a transverse sectional view, with a portion broken away, of the dual-mode two-way clutch according to a first preferred embodiment of the present invention.
FIG. 1B is a cross-sectional view taken along the line I—I in FIG. 1A.

A dual-mode two-way clutch according to a first preferred embodiment of the present invention will first be described with reference to FIGS. 1 A to 7. The two-way clutch comprises, as shown in FIGS. 1A and 1B, a first member which is in the form of an inner race 1; a second member which is in the form of an outer race 2; a plurality of engagement elements which are in the form of rolling elements 3 such as, for example, rollers interposed between the inner and outer races 1 and 2; a retainer 4 for retaining the rolling elements 3 in a substantially circular row; and an elastic member 5 which may be a leaf spring member and which is held in contact with an inner peripheral surface of the outer race 2. This dual-mode two-way clutch also comprises a lock means 12 and a lock release means 13, both of which will be described later. In any event, the dual-mode two-way clutch of the structure so far described above makes use of the basic structure of the two-way clutch.

Figure 2:
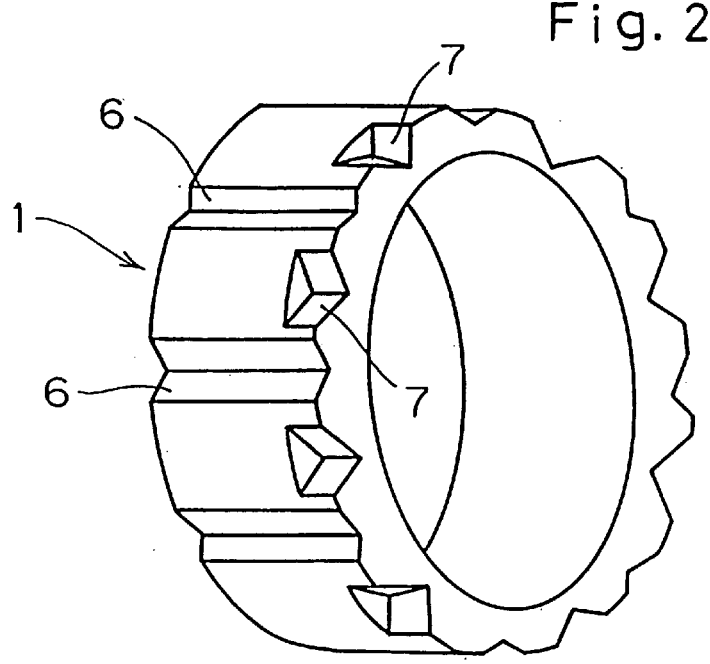
FIG. 2 is a perspective view of an inner race used in the dual-mode two-way clutch shown in FIG. 1A.
Figure 3A:
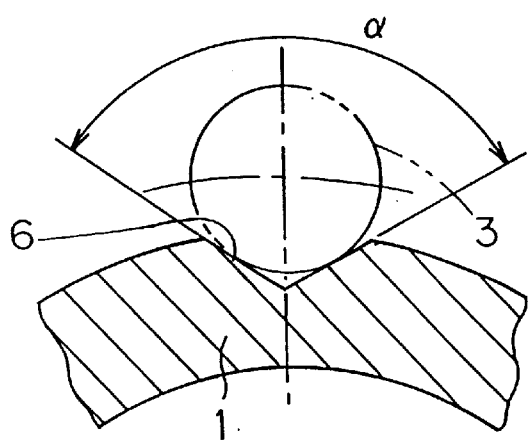
FIGS. 3A and 3B are schematic fragmentary sectional views, on an enlarged scale, of a portion of the inner race employed in the dual-mode two-way clutch shown in FIG. 1A, showing different cam faces which can be defined in the inner race, respectively.
Figure 3B:
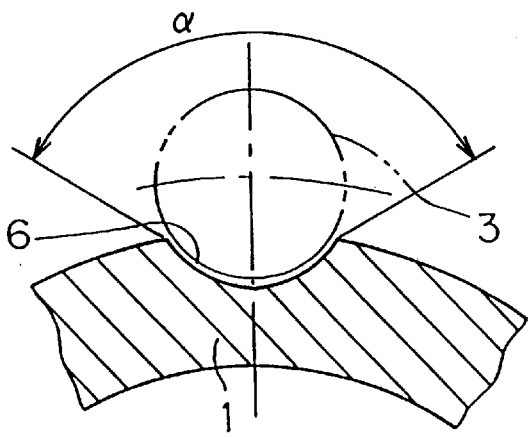

As shown in FIG. 2, the inner race 1 is in the form of a thick-walled hollow cylinder and has its outer peripheral surface formed with a plurality of cam faces 6 that are spaced an equal distance in a direction circumferentially of the inner race 1 and extend in a direction axially of the inner race 1 as clearly shown in FIG. 2. The cam faces 6 are utilized to allow the clutch to exhibit a locking function and are indented radially inwardly from the outer peripheral surface of the inner race 1 to represent a generally V-sectioned configuration as viewed axially of the inner race 1. Each of those cam faces 6 has a width as measured in a direction circumferentially of the inner race 1 and has a maximum depth at a location intermediate of the width thereof with its opposite side face segments flared towards the outer peripheral surface of the inner race 1 accompanied by progressive decrease of the depth of the respective cam face 6. It is, however, to be noted that each of the cam faces 6 may be delimited by opposite straight side face segments as shown in FIG. 3A or may be delimited by is a curved face, for example, a substantially semi-circular face as shown in FIG. 3B. In either case, as shown in FIG. 3A or 3B, each of the cam faces has a flaring angle α as defined between straight lines extending radially outwardly of the inner race 1 from the point of maximum depth of the respective cam face 6 so as to flare outwardly while touching opposite edges delimited between the outer peripheral surface of the inner race 1 and the respective cam faces 6, which angle α is so chosen as to be within the range of 155 to 175°. Although in the illustrated embodiment the cam faces 6 have been shown as extending axially over the whole length of the inner race 1, the present invention may not be limited thereto and the cam faces 6 may be formed in a portion of the axial length of the inner race 1.

As best shown in FIG. 2, the inner race 1 has one of its opposite ends formed with a plurality of retainer fixing grooves 7 defined in an outer peripheral edge portion of that end of the inner race 1 so as to extend radially inwardly thereof and also so as to, for example, alternate with the cam faces 6 in a direction circumferentially of the inner race 1. Each of the retainer fixing grooves 7 has a width as measured in a direction circumferentially of the inner race 1 and is of a shape having a maximum depth at a location intermediate of the width thereof. In the illustrated embodiment, each of the retainer fixing grooves 7 is employed in the form of a generally V-shaped groove and has a similar flaring angle which is so chosen as to be smaller than that of each of the cam faces 6.

It is to be noted that although in the illustrated embodiment the inner race 1 has been described as comprised of the thick-walled hollow cylinder, it may be a shaft, in which case the cam faces 6 and the retainer fixing grooves 7 are formed directly on the shaft.

As shown in FIGS. 1A and 1B, the outer race 2 has its inner peripheral surface serving as a circumferential raceway 2a of a cylindrical configuration along which the rolling elements 3 in the form of the rollers can rotate in contact therewith. The circumferential raceway 2a of the outer race 2, the cam faces 6 in the inner race 1 and the rolling elements 3 altogether constitute a locking means 12 operable to avoid a relative rotation of the inner and outer races 1 and 2 in any one of forward and reverse directions opposite to each other about the longitudinal axis of the dual-mode two-way clutch of the present invention.

The outer race 2 although employed in the form of a thick-walled hollow cylindrical component parts in the illustrated embodiment with its outer peripheral surface being a cylindrical surface may have the outer peripheral surface of any arbitrarily chosen shape such as, for example, a wheel-shaped, a pulley-shaped or any other shape depending on the particular application of the dual-mode two-way clutch of the present invention. Also, in the illustrated embodiment, the outer race 2 has an axial length smaller than that of any one of the inner race 1 and the retainer 4 so that an outer peripheral surface 4a of one of opposite ends of the retainer 4 adjacent engagement projections 9, as will be described later, can be exposed to the outside of the dual-mode two-way clutch by the reason which will become clear from the subsequent description.

Figure 4:
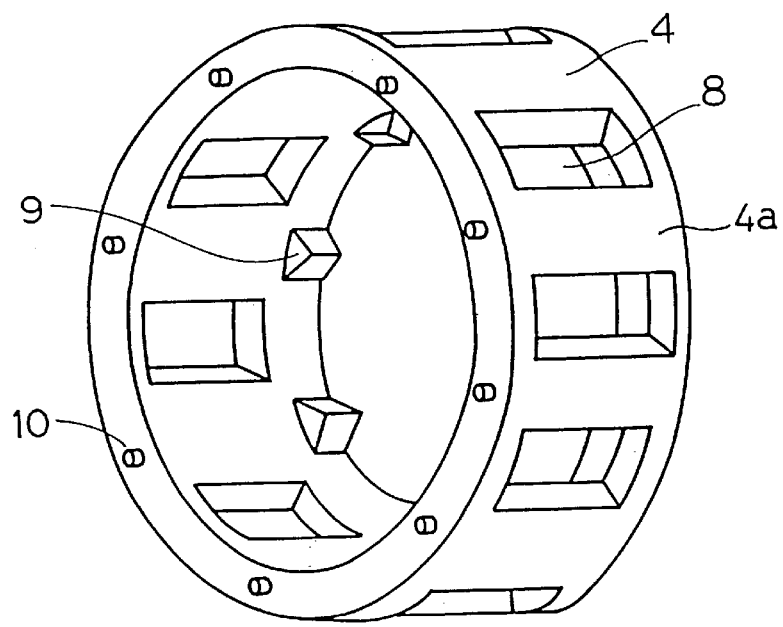
FIG. 4 is a perspective view of a retainer used in the dual-mode two way clutch shown in FIG. 1A.

The retainer 4 is, as best shown in FIG. 4, in the form of a hollow cylinder having a plurality of generally rectangular pockets 8 defined therein so as to extend completely across the thickness of the retainer 4. The rectangular pockets 8 are used for rotatably accommodating therein the corresponding rolling elements 3 and are spaced an equal distance from each other in a direction circumferentially of the retainer 4. This retainer 4 is formed with the engagement projections 9 of a generally triangular shape that are engageable in the corresponding retainer fixing grooves 7 (See FIG. 2) and spring fixing pins 10 spaced a distance from each other in a circumferential direction of the retainer 4 and protruding from one end face of the retainer 4 in a direction conforming to the longitudinal axis of the retainer 4.

Specifically, the engagement projections 9 integral with the retainer 4 are formed on the inner peripheral surface of the retainer 4 at one of opposite ends thereof and protrude radially inwardly therefrom so as to represent a generally triangular shape complemental to the shape of the corresponding retainer fixing grooves 7. On the other hand, the spring fixing pins 10 are formed on the end face of the retainer 4 remote from the row of the engagement projections 9. The engagement projections 9 integral with the retainer 4 and the mating retainer fixing grooves 7 in the inner race 1 altogether form a guide means 14 as shown in FIG. 1B, which guide means 14 cooperates with the retainer 4 to form the lock release means 13 referred to hereinbefore.

Figure 5:
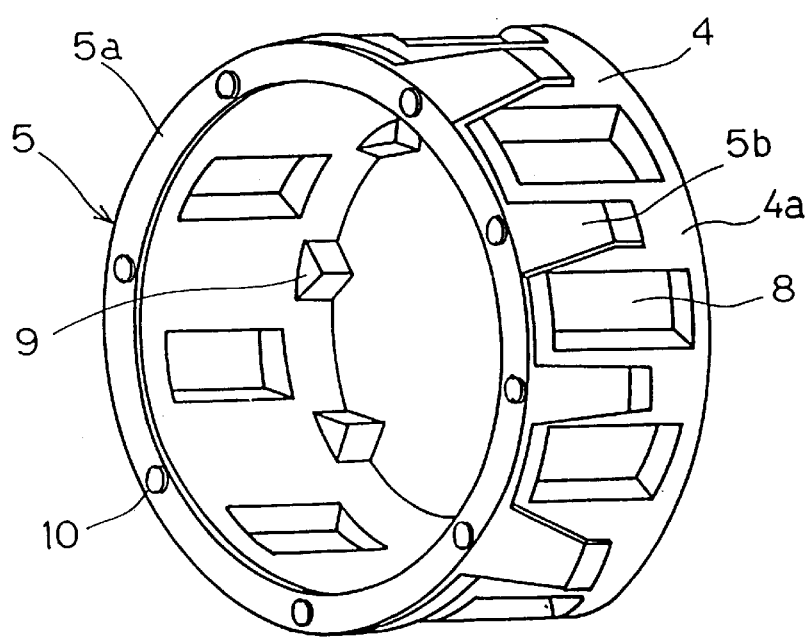
FIG. 5 is a perspective view of the retainer of FIG. 4 having an elastic, member fitted thereto.

FIG. 5 illustrates the retainer 4 having been mounted with the elastic member 5. The elastic member 5 comprises a leaf spring member including a ring-shaped side plate 5a and a plurality of arm-shaped spring tongues 5b formed, integrally with the ring-shaped side plate 5a so as to protrude a slight distance radially outwardly from the ring-shaped side plate 5a and then bent to extend in axial direction of the ring-shaped side plate 5a. More specifically, the ring-shaped side plate 5a is formed with anchor holes for receiving the respective spring fixing pins 10 and, therefore, when the elastic member 5 is fixedly mounted to the retainer 4 with the spring fixing pins 10 inserted in the associated anchor holes in the ring-shaped side plate Sa of the elastic member 5 as shown in FIG. 5, the spring tongues 5b extends from the ring-shaped side ring 5a in a direction generally parallel to the longitudinal axis of the retainer 4. Respective free ends of the spring tongues 5b of the elastic member 5 are adapted to resiliently engage the inner peripheral surface of the outer race 1 as will become clear from the subsequent description. It is to be noted that fixing of the elastic member 5 to the retainer 4 may be accomplished by, for example, crushing to bulge respective tips of the spring fixing pins 10 then received within the anchor hole in the ring-shaped side plate 5a or by means of melt-bonding, riveting, bonding.

The elastic member 5 is utilized to develop a friction between the outer race 2 and the retainer 4 so that the retainer 4 can be rotated by rotation of the outer race 2 due to a frictional force acting in a direction of rotation thereof between the outer race 2 and the retainer 4. Provided that this function can be implemented, the elastic member 5 may be made of an elastic material such as, for example, rubber other than the spring member. By way of example, as shown in FIGS. 9A and 9B showing a modification, a ring-shaped elastic member 5A such as, for example, an O-ring, may be employed instead of the elastic member 5 discussed above. Where the ring-shaped elastic member 5A is employed, it may be embedded in a circumferentially extending annular groove formed in the outer peripheral surface of the retainer 4, or may be embedded in a circumferentially extending annular groove formed in the inner peripheral surface of the outer race 2. Also, instead of the use of the O-ring for the ring-shaped elastic member 5A, either a wire spring or a leaf spring, both undulated in a radial direction, may be employed for the ring-shaped elastic member SA although not shown. Again, as shown in FIG. 10, the elastic member may comprises a plurality of elastic elements 5B that are fixedly embedded within corresponding recesses defined locally in the outer peripheral surface of the retainer 4. Yet, instead of the use of the separate elastic member, the retainer 4 itself may be configured to represents a polygonal shape or may have its outer peripheral surface formed with a plurality of protrusions, so that circumferential portions of the outer peripheral surface of the retainer 4 can engage the inner peripheral surface of the outer race 2 with the requisite frictional force developed by the elasticity of the retainer 4 itself between the outer race 2 and the retainer 4 so that rotation of the outer race 2 can be accompanied by a corresponding rotation of the retainer 4.

Figure 6A:
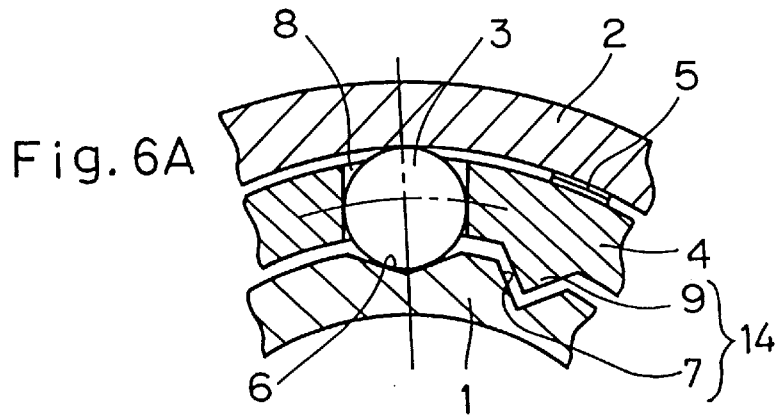
FIGS. 6A and 6B are schematic fragmentary sectional views, on an enlarged scale, showing different manners of engagement between engagement projections and retainer fixing grooves both used in the dual-mode two-way clutch of the present invention, respectively.

Hereinafter, description of the function of the dual-mode two-way clutch of the structure described above and an additional description of the structure will be made. So long as the dual-mode two-way clutch assumes an ideal state under a natural condition as shown in FIGS. 1A and 1B, each of the rolling elements 3 is, as shown in FIG. 6A, held at a position (a neutral position) intermediate of the width of the corresponding cam face 6 and, at the same time, the engagement projections 9 integral with the retainer 4 are in phase-synchronism with the retainer fixing grooves 7 in the inner race 1 with respect to the direction circumferentially thereof Also, each of the pockets 8 in the retainer 4 for accommodating the respective rolling elements 3 is of such a size that a gap can be formed between the corresponding rolling element 3 and the wall defining the pocket 8 in a direction circumferentially of the retainer 4. In the practice of the present invention, this gap between each rolling element 3 and the wall defining the corresponding pocket 8 is of a size which is extremely small, for example, 1% or less of the diameter of the rolling element 3 or which may be sufficient to form a negative gap.

Figure 6B:
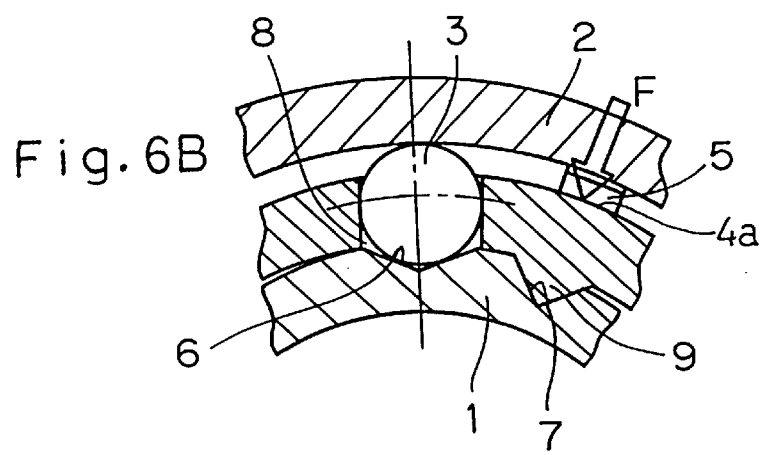

When starting from this condition an external force F is applied exteriorly to that exposed outer surface area 4a of the retainer 4 in the vicinity of the engagement projections 9 as shown by the arrow in FIG. 1B to thereby urge the retainer 4 towards the inner race 1, that portion of the retainer 4 to which the external force F has been applied undergoes deformation as shown in FIG. 6B with the result that the adjacent engagement projection 9 is completely engaged in the associated retainer fixing groove 7 in the inner race 1 with no gap formed between the adjacent engagement projection 9 and the associated retainer fixing groove 7. Accordingly, the retainer 4 is guided in the circumferential direction relative to the inner race 1 with the phase relationship between the retainer 4 and the inner race 1 consequently fixed. As a result thereof, all of the rolling elements 3 are forcibly guided towards and retained at respective positions intermediate of the width of the associated cam faces 6, which positions are neutral positions in the associated cam faces 6. The number of portions at which the retainer 4 is urged against the inner race 1 are preferably two or four equally spaced in the circumferential direction.

In the condition in which the rolling elements 3 assume the neutral positions in the associated cam faces 6, no relative rotation in the circumferential direction occur between the inner race 1 and the retainer 4. Also, the elastic tongues 5b of the elastic member 5 fixed to the retainer 4 are disengaged from the inner peripheral surface of the outer race 2 and, so long as the rolling elements 3 assume the neutral- positions intermediate of the width of the associated cam faces 6, the rolling elements 3 are so designed as to provide a slight gap relative to the outer race 2 in the radial direction (and consequently a gap is also formed in the circumferential direction).

Accordingly, under this condition, no rotation locking function can be exhibited by the dual-mode two-way clutch. In other words, the outer race 2 can be rotatable not only in the forward direction (for example, clockwise), but also in the reverse direction opposite to the forward direction, about the longitudinal axis of the dual-mode two-way clutch.

If, however, the external force F used to urge the retainer 4 radially inwardly towards the inner race 1 is removed, the dual-mode two-way clutch of the present invention restores to the condition as shown in FIG. 6A. Starting from this condition and if the inner race 1 is fixed and the outer race 2 is rotated clockwise as viewed in FIGS. 1A, the retainer 4 starts its clockwise direction, that is, in the same direction as the direction of rotation of the outer race 2 by the effect of the friction imparted by the elastic member 5. As a result thereof, the rolling elements 3 accommodated within the respective pockets 8 in the retainer 4 rotate in the clockwise direction simultaneously with rotation of the retainer 4 and, consequently, the rolling elements 3 are displaced an extremely small angle of rotation until they are brought into engagement with the associated cam faces 6 in the inner race 1.

Figure 7A:
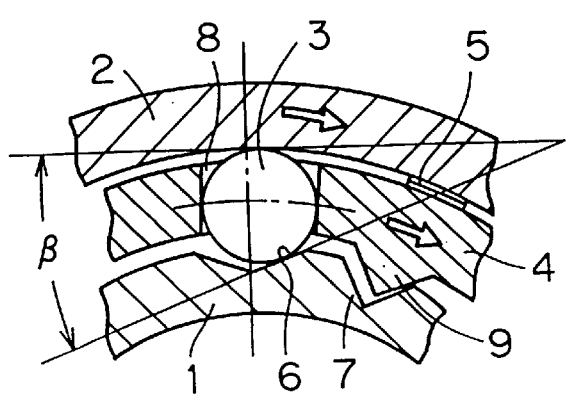
FIGS. 7A and 7B are schematic fragmentary sectional views, on an enlarged scale, showing different manners of engagement between the engagement projections and the retainer fixing grooves in the dual-mode two-way clutch of the present invention, respectively, depending on the direction of rotation of an outer race relative to an inner race.
Figure 7B:
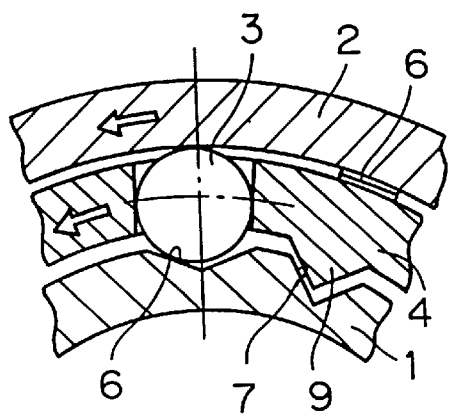

The condition in which the rolling elements 3 are brought into engagement with the associated cam faces 6 in the inner race 1 is illustrated in FIGS. 7A and 7B. As shown therein, the angle β formed between the tangential line passing in touch with the point of contact of each rolling element 3 with the associated cam face 6 and the tangential line passing in touch with the point of contact of each rolling element 3 with the outer race 2 is within the range of 5 to 25°[180°−(155°~175°)]. This angle β is generally analogous to the thrust angle referred to in connection with the standard clutch.

In the condition shown in FIG. 7A, the outer race 2 is no longer able to rotate further in the clockwise direction. In other words, the dual-mode two-way clutch of the present invention is set in a locked position to perform a rotation locking function. In such case, the engagement projections 9 integral with the retainer 4 are so dimensioned and so sized that they have not yet been engaged in the associated retainer fixing grooves 7 in the inner race 1.

Even when the outer race 2 rotates in the counterclockwise direction, the various component parts of the dual-mode two-way clutch of the present invention undergo movement in a manner similar to that described above to permit the dual-mode two-way clutch to perform the rotation locking function. In other words, unless the external force F is applied to the retainer 4, the outer race 2 can rotate neither in the clockwise direction nor in the counter clockwise direction.

In order for the outer race 2 to be rotatable in any of the opposite directions and also to rotate idle, all that are necessary is to apply the external force F to the retainer 4 to urge the latter towards the inner race 1. By so doing, the rolling elements 3 are shifted to a position intermediate of the associated cam faces 6 or the neutral position to create the gap between the rolling elements 3 and the outer race 2 wherefore the rotation locking function is disabled.

As discussed above, the dual-mode two-way clutch of the present invention is so designed and so structured that depending on whether or not the external force F is applied to the retainer 4, the dual-mode two-way clutch of the present invention can be set to one of the operative position, in which the outer race 2 is rotatable in any one of the clockwise and counterclockwise directions and also rotate idle, and the locked position in which the rotation locking function is enabled, that is, the outer race 2 will not rotate in any one of the clockwise and counterclockwise directions. For this reason, where, for example, the dual-mode two-way clutch of the present invention is applied in association with bearings used in, for example, a wheeled cart or door, an inexpensive safety mechanism can be realized with which the cart or the door can be brought to a halt immediately after a force applied to the cart or the door, which corresponds to the external force F referred to above, is released from the cart or the door.

Figure 8A:
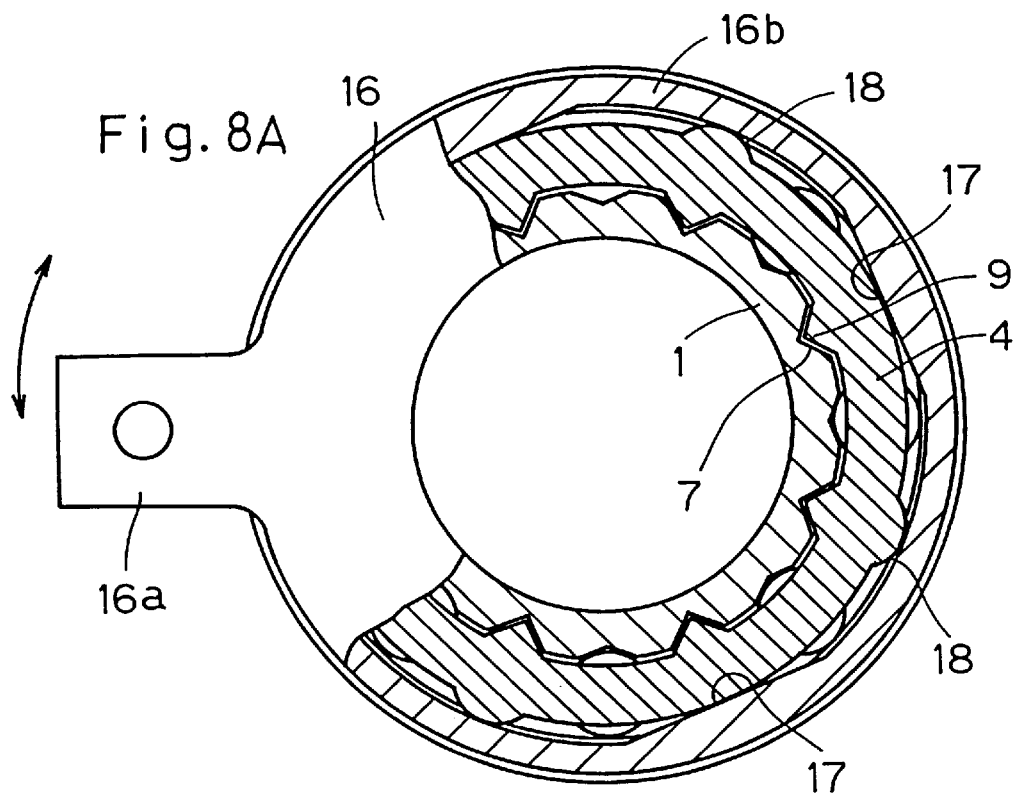
FIG. 8A is a transverse sectional view of the dual-mode two-way clutch provided with an operating member shown with a portion broken away.
Figure 8B:
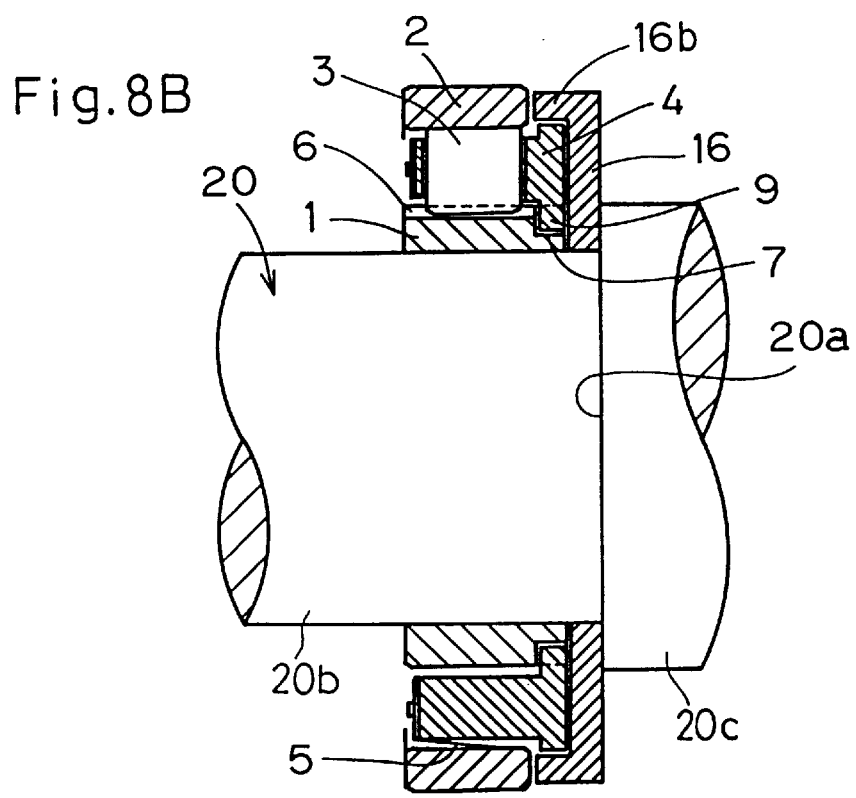
FIG. 8B is a longitudinal sectional view of the dual-mode two-way clutch shown in FIG. 8A.

FIGS. 8A and 8B illustrates a modified form of the dual-mode two-way clutch of the structure shown in FIGS. 1A to 7B, in which an operating member 16 for applying the external force is applied. The operating member 16 is in the form of a ring-shaped member having an outer peripheral portion integrally formed with a radially outwardly extending handle 16a. This operating member 16 is rotatably mounted on a shaft 20 press-fitted into the inner race 1. The shaft 20 has a reduced diameter portion 20b and a large diameter portion 20c with a stepped annular face 20a defined there-between. The inner race 1 is fixedly mounted on the reduced diameter portion 20b of the shaft 20 at a location spaced axially a slight distance from the stepped annular face 20a, while the annular end face of the retainer 4 adjacent the retainer fixing grooves 7 is oriented towards the stepped annular face 20a of the shaft 20. The operating member 16 mounted rotatably on the shaft 20 is positioned between the inner race 1 and the stepped annular face 20a of the shaft 20.

The operating member 16 has a flange or collar 16b formed preferably integrally therewith so as to extend in a direction perpendicular to the body of the operating member 16, or axially of the dual-mode two-way clutch. This collar 16b is, when the operating member 16 is mounted on the shaft 20 in the manner described above, positioned so as to overhang the outer periphery of the retainer 4 as best shown in FIG. 8B. Also, as shown in FIG. 8A, the collar 16b has an inner peripheral surface formed with a plurality of, for example, four first cam faces 17 that are spaced a distance from each other in a circumferential direction of the collar 16b. The first cam faces 17 are utilized to apply the external force F radially inwardly to the retainer 4 as the operating member 16 is turned as will be described in detail later.

Each of the first cam faces 17 formed in the inner peripheral surface of the collar 16b is flat occupying a chord of the circle represented by the inner peripheral surface of the collar 16b. Cooperable with these first flat cam face 17 is a corresponding number of second operating cam faces 18 each in the form of a generally semi-circular sectioned cam protrusion formed on the outer peripheral surface of the retainer 4.

The use of the operating member 16 is effective to apply the external, force F to the retainer 4 simply by turning the operating member 16 with a turning force applied to the handle 16a. More specifically, assuming that the dual-mode two-way clutch is in the locked position exhibiting the rotation locking function as shown in FIG. 8A, turn of the operating member 16 through a predetermined angle, for example, about 45° in the illustrated embodiment, results in engagement of the first cam faces 17 with the second cam faces 18 with the consequence that the external force necessary to urge the retainer 4 towards the inner race 1 is applied to the retainer 4 through the collar 16b of the operating lever 16. Accordingly, by the effect of the external force so applied, the retainer 4 undergoes deformation to cause the dual-mode two-way clutch to be set to the operative position in which the rotation locking function is disabled. Turn of the operating lever 16 in the reverse direction to assume the initial position shown in FIG. 8A results in that the retainer 4 once deformed restores to the original shape by the effect of its own elasticity, causing the dual-mode two-way clutch to assume the locked position in which the rotation locking function is enabled.

It is to be noted that the modified dual-mode two-way clutch shown in FIGS. 8A and 8B is substantially similar to the dual-mode two-way clutch shown in FIGS. 1A to 7B, except that the use has been made of the second cam faces 18 in the retainer 4 and also the operating member 16.

The dual-mode two-way clutch according to a second preferred embodiment of the present invention will now be described with reference to FIGS. 11A to 14. In this second preferred embodiment of the present invention, the dual-mode two-way clutch is so designed and so constructed that application of the external force in an axial direction, instead of the radial direction as is the case in the foregoing embodiment, causes the dual-mode two-way clutch to assume the operative. Except for the details of the guide means and the use of a different width of the outer race 2, the dual-mode two-way clutch shown in FIGS. 11A to 14 is substantially similar to that shown in FIGS. 1A to 7B. It is, however, to be noted that in the practice of the second preferred embodiment of the present invention, it is not essential to form the retainer 4 with an elastically deformable material.

Figure 12:
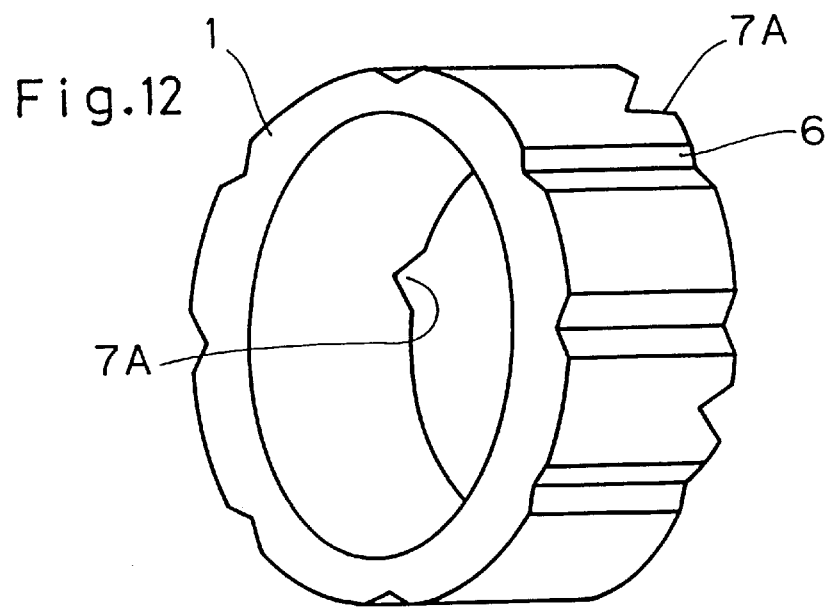
FIG. 12 is a perspective view of the inner race employed in the dual-mode two-way clutch shown in FIG. 11A.
Figure 13:
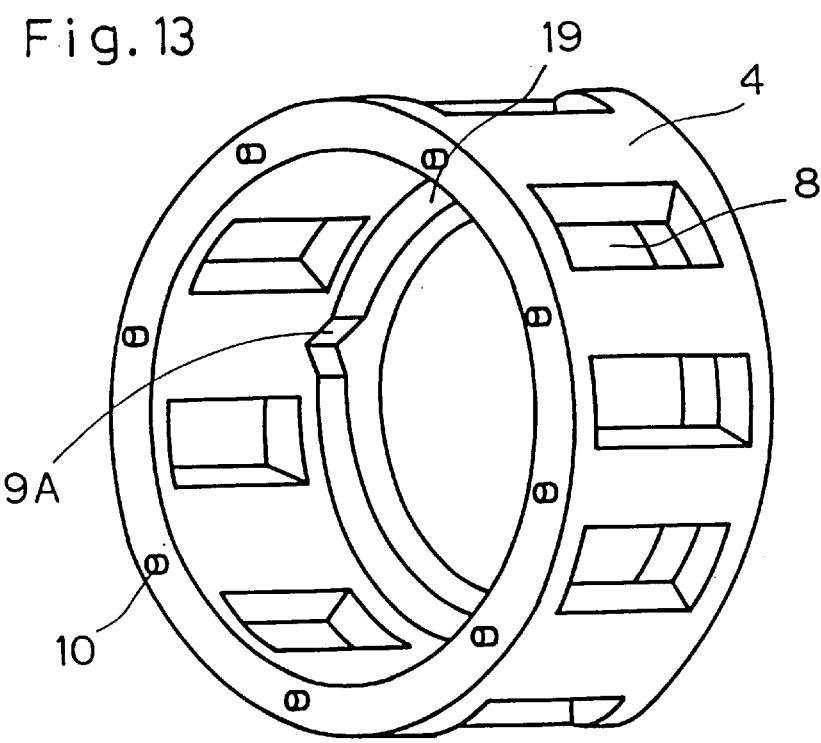
FIG. 13 is a perspective view of the retainer employed in the dual-mode two-way clutch shown in FIG. 11A.

As shown in FIG. 12, one end of the inner race 1 is formed with retainer fixing grooves 7A cut out axially inwardly from the end face thereof into a generally V-shaped configuration. On the other hand, as shown in FIG. 13, the retainer 4 has one end formed integrally with a radially inwardly protruding flange or collar 19 having an inner peripheral surface and outer and inner annular surfaces opposite to each other. The collar 19 has the inner annular surface formed with engagement projections 9A equal in number to the V-shaped retainer fixing grooves 7A and complemental in shape to the shape of the corresponding V-shaped retainer fixing grooves 7A. These retainer fixing grooves 7A and the corresponding engagement projections 9A altogether constitute the guide means 14A. The cam faces grooves 6 on the outer peripheral surface of the inner race 1 are similar in shape to the cam grooves 6 used in the dual-mode two-way clutch according to the first preferred embodiment of the present invention.

In the second preferred embodiment of the present invention, switching of the dual-mode two-way clutch from the unlocked position towards the locked position is accomplished by applying an external force $F_A$, as shown in FIG. 11B, axially to the retainer 4 to cause the retainer 4 to displace axially towards the inner race 1. More specifically, when the retainer 4 is so axially urged by the application of the external force $F_A$ thereto, the engagement projections 9A integral with the retainer 4 are completely engaged in the respective retainer fixing grooves 7A in the inner race 1, causing the retainer 4 to be locked to the inner race 1 with the rolling elements 3 brought to a position intermediate of the associated cam faces 6 in a manner as hereinbefore described. Accordingly, in this condition, the outer race 2 is rotatable in any one of the clockwise and counterclockwise directions relative to the inner race 1. When the application of the external force $F_A$ to the retainer 4 is released, the dual-mode two-way clutch is held in the locked position in which, as is the case with that in the foregoing embodiment 1, the outer race 2 is no longer rotatable, in any one of the clockwise and counterclockwise directions.

It is to be noted that in the second preferred embodiment of the present invention, in order to increase the response to the switching of the dual-mode two-way clutch between the operative and locked positions, the use is preferred of a means for positively retuning the retainer 4 to the initial position which exerts an external force P acting in a direction, as shown in FIG. 11B, counter to the direction of application of the external force FA.

The dual-mode two-way clutch according to the second embodiment of the present invention shown in FIGS. 11A to 14 can be modified to have a similar operating member as hereinbefore described with reference to FIGS. 8A and 8B. Referring to FIGS. 15 to 16C showing a third embodiment of the present invention, the operating member is generally identified by 16A. This operating member 16A is in the form of a generally ring-shaped member having a radially outwardly extending handle 16a and is rotatably mounted externally on the shaft 20 on which the inner race 1 is fixedly mounted. The shaft 20 has a reduced diameter portion 20b and a large diameter portion 20c with a stepped annular face 20a defined there-between. The inner race 1 is fixedly mounted on the reduced diameter portion 20b of the shaft 20 at a location spaced axially a slight distance from the stepped annular face 20a, while the annular end face of the retainer 4 adjacent the retainer fixing grooves 7 is oriented towards the stepped annular face 20a of the shaft 20. The operating member 16A mounted rotatably on the shaft 20 is positioned between the inner race 1 and the stepped annular face 20a of the shaft 20.

Figure 16A:
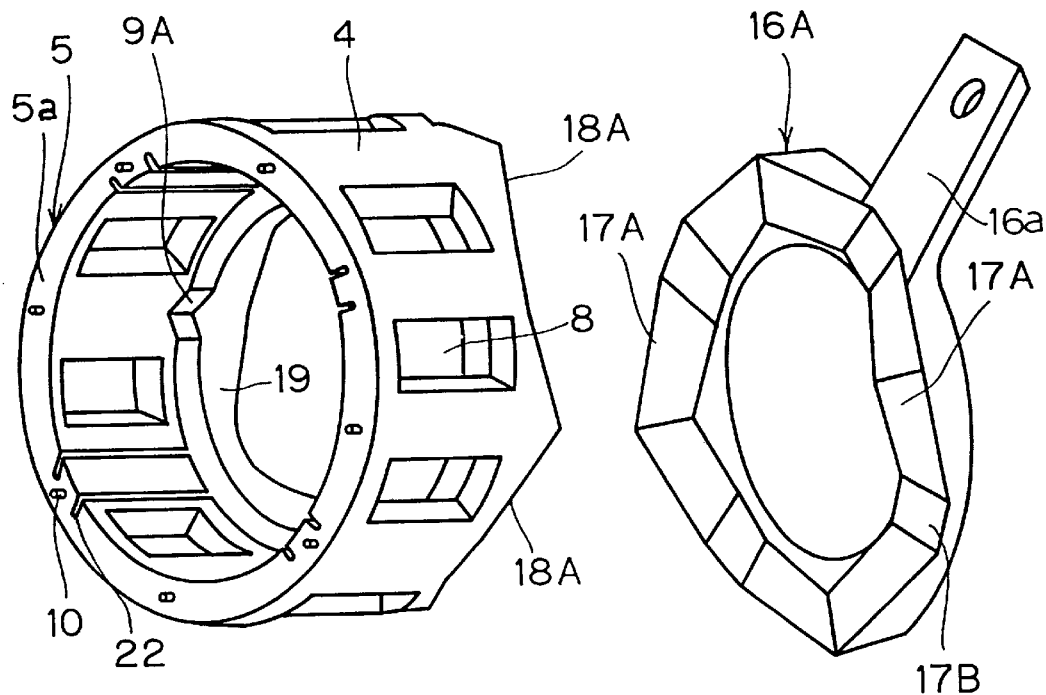
FIG. 16A is an exploded view of a portion of the dual-mode two-way clutch shown in FIG. 15A, showing the retainer and the operating member both used therein.

As shown in FIG. 16A, the operating member 16A has a first annular face, facing the adjacent annular face of the retainer 4, and a second annular face opposite to the first annular face. The first annular face of the operating member 16A is formed with a plurality of, for example, four first cam faces 17A that are spaced a distance from each other in a circumferential direction of the operating member 16A. The first cam faces 17A are utilized to apply the external force $F_A$ axially to the retainer 4, as shown in FIG. 11B, as the operating member 16A is turned as will be described in detail later. It is to be noted that a portion of the first annular face of the operating member 16A between the neighboring first cam faces 17A is made flat to define a respective flat area indicated by 17B.

Cooperable with these first cam faces 17A is a corresponding number of second operating cam faces 18A each in the form of a generally semi-circular sectioned cam protrusion formed on the annular end face of the retainer 4 that faces the first annular end face of the operating member 16A.

In any event each of the first cam faces 17A although representing a generally V-shaped projection has its side faces inclined moderately and, correspondingly, each of the second cam faces 18A although representing a generally V-shaped recess has its side faces inclined moderately. It is, however, to be noted that in the practice of the present invention only one of the first cam faces 17A and the second cam faces 18B suffice to have the V-shaped configuration, in which case the other of the first cam faces 17A and the second cam faces 18B may have any suitable shape, for example, a generally arcuate shape.

Figure 16B:
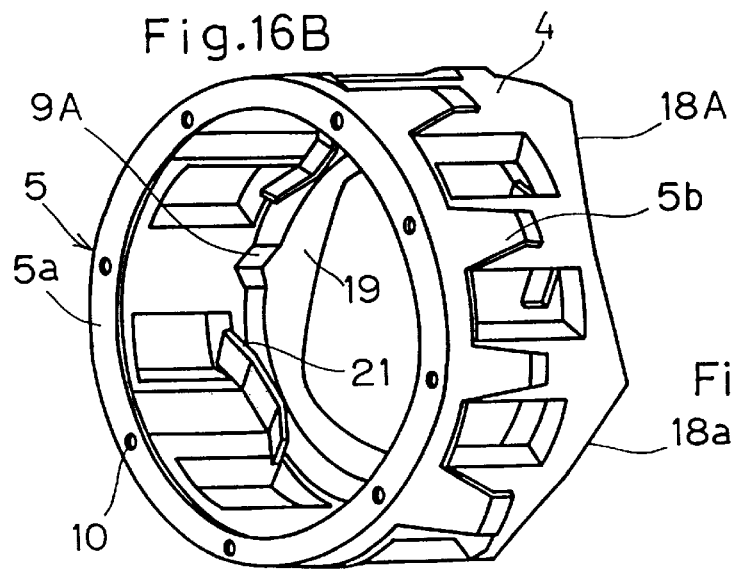
FIG. 16B is a perspective view of the retainer used in the dual-mode two-way clutch shown in FIG. 15A, showing the elastic member and return elastic members fitted thereto.
Figure 16C:
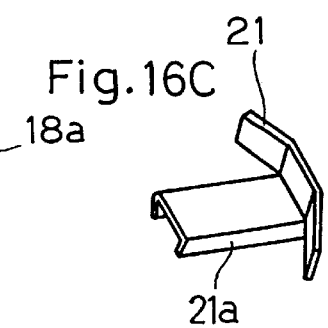
FIG. 16C is a perspective view of one of the return elastic members shown in FIG. 16B.
Figure 20:
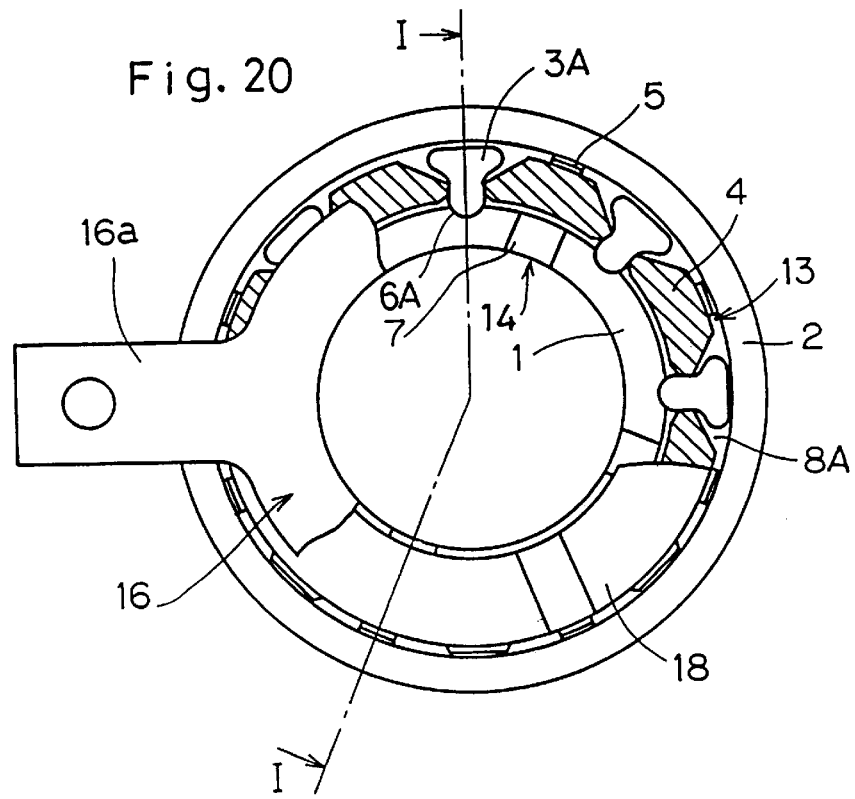
FIG. 20 is a transverse sectional view of the seat back adjusting mechanism according to a fifth preferred embodiment of the present invention.

As shown in FIG. 16B, the retainer 4 has a plurality of return elastic members 21 as built therein in contact with the annular end face of the inner race I adjacent to the operating member 16A. Each of the return elastic members 21 is utilized to apply the external force shown by P in FIG. 1B to the retainer 4 to displace the retainer 4 in a direction required for the engagement projections 9A to disengage from the corresponding retainer fixing grooves 7A and comprises, as shown in FIG. 16C, a leaf spring member having a mount 21a formed integrally therewith and engaged in mounting grooves 22 (FIG. 16A) defined in the inner peripheral surface of the retainer 4 so as to extend axially.

Where the operating member 16A is utilized in the manner as hereinabove described, and when the operating member 16A is turned a predetermined angle, for example, about 45° in the illustrated embodiment, from the locked position shown in FIG. 15A, the first and second cam faces 17A and 18A shown in FIG. 15B are brought into engagement with each other, resulting in that the external force necessary to urge the retainer 4 towards the inner race 1 is applied to the retainer 4 through the operating member 16A. Accordingly, by the effect of the external force so applied, the retainer 4 undergoes deformation to cause the dual-mode two-way clutch to be set to the operative position in which the rotation locking function is disabled. Turn of the operating member 16A in the reverse direction to assume the initial position shown in FIG. 15A results in that the retainer 4 once deformed restores to the original position by the effect of the elasticity exerted by the return elastic members 21, causing the dual-mode two-way clutch to assume the locked position in which the rotation locking fiction is enabled.

It is to be noted that the dual-mode two-way clutch shown in FIGS. 15 to 16C is substantially similar to that shown in FIGS. 11A to 14, except that in the modification shown in FIGS. 15 to 16C, the second cam faces 18A are formed in the retainer 4, the use has been made of the operating member 16A and the return elastic members 21 are utilized.

FIGS. 17 to 19B illustrate a fourth preferred embodiment of the present invention in which the dual-mode two-way clutch according to the present invention is applied to a seat back adjustment used in, for example, an automobile seat assembly.

Referring particularly to FIG. 17, the seat assembly therein comprises a seat 33, a reclining seat back 34, and a tilt angle adjuster for reclining the seat back 34 about a hinge axis relative to the seat 33. In the vicinity of the hinge axis, the seat 33 is connected with the seat back 34 by means of a generally elongated fixed frame 31 having one end firmly secured to a back portion of the seat 33, and a similarly elongated movable frame 34 firmly secured to a lower portion of the seat back 34 through the tilt angle adjuster which is constituted by the dual-mode two-way clutch 30 of the present invention as will now be described. It is to be noted that each of the fixed and movable frames 31 and 32 is preferably employed in the form of a arm-shaped plate.

As shown in FIG. 18, the dual-mode two-way clutch 30 includes the operating handle 16a connected with the fixed frame 31 by means of a handle returning spring 22 for normally urging the operating member 16A counterclockwise as viewed therein. In this structure, when the handle 16a of the operating member 16A is pulled upwardly as viewed in FIG. 18, i.e., turned clockwise to against the handle returning spring 22 and the seat back 34 shown in FIG. 17 is tilted backwardly, the seat back 34 can be automatically locked at the position to which it has been tilted even though an external force applied to the handle 16a is removed to allow the latter to return to the original position as pulled by the return spring 22.

It is to be noted that as shown in FIG. 17 the seat back 34 is normally biased towards a generally upright position by the action of a return spring 35 interposed between the seat back 34 and, for example, an automobile floor. It is also to be noted that although the return spring 35 is shown in the form of a coil spring, a flat spiral spring is in most cases employed for biasing the seat back 34 towards the upright position in the form as incorporated around the hinge axis which is, in the illustrated embodiment, defined by the longitudinal axis of the dual-mode two-way clutch of the present invention as will be described subsequently.

Referring to FIGS. 19A and 19B, the dual-mode two-way clutch 30 is of a construction substantially identical with that shown in and described with reference to FIGS. 11A to 14 and includes the inner race 1, the outer race 2, the rolling elements 3, the retainer 4, the elastic member 5, a return elastic member 21A in the form of a spring, and the operating member 16. The fixed frame 31 fast with the seat 33 has a stud shaft 41 welded, or otherwise fixed in any suitable manner, to the fixed flame 31 in a cantilever fashion so as to extend at right angles thereto. The inner race 1 is in the form of a hollow cylinder having one end formed with an inner collar 1a and is mounted on the stud shaft 41 extending through a center bore of the inner collar 1a to position it with respect to a radial direction of the stud shaft 41. The inner race 1 is firmly fixed to the fixed frame 31 by means of any suitable method, for example, by welding or by the use of fastening member 36, for example, rivets extending through the inner collar 1a.

The inner race 1 has its outer peripheral surface formed with a plurality of axially extending cam faces 6 spaced an equal distance from each other in a direction circumferentially of the inner race 1 and also has a radially inwardly stepped shoulder 1b defined at one end thereof adjacent the collar 1a. An annular groove delimited between the fixed frame 31 and an axially confronting annular face of the radially inwardly stepped shoulder 1b is utilized to loosely accommodate an inner collar 2a of the outer race 2 to thereby define a radial and axial bearing portion 40 which is comprised of a plain bearing.

The outer race 2 so supported by the bearing portion 40 is constrained from moving relative to the inner race 1 and the fixed frame 31 in respective directions radially and axially and is capable of rotating relative to the inner race 1. This outer race has an outer collar 2b formed integrally with one end thereof opposite to the inner collar 2a so as to extend radially outwardly, which collar 2b is welded, or fixed in any suitable manner, to the movable frame 32 fast with the seat back 34. The operating member 16A having the handle 16a (FIG. 18) formed integrally therewith is prepared from a plate material and is mounted rotatably on the stud shaft 41 and is axially immovably positioned by a stop ring 37, mounted on the stud shaft 41, so as to confront the retainer 4. To restrict an arbitrary movement of the operating member 16A in a direction towards the retainer 4, a spacer sleeve 38 is mounted on the stud shaft 41 and positioned between the inner collar 1a of the inner race 1 and the operating member 16.

In the dual-mode two-way clutch 30 employed in the fourth embodiment of the present invention, the inner race 1 discussed above is of a structure identical with that shown in FIG. 12; the retainer 4 discussed above is of a structure identical with that shown in FIGS. 16A except the return elastic member 21 and the operating member 16A is of a structure identical with that shown in FIG. 16A. A return elastic member 21A is mounted between the retainer 4 and the inner collar 2a of the outer race 2 and applies a return force to the retainer 4 towards the operating member 16. The return elastic member 21A may be a Belleville spring or a leaf spring The tilt angle adjuster of the structure described above operates in the following manner. Assuming that the handle 16a is held at a neutral position as shown in FIG. 17 at which position the handle 16a extends nearly horizontally, the second cam faces 18A at the end face of the retainer 14 and the first cam faces 17A of the operating member 16A, as shown in FIG. 19B, are disengaged from each other and, therefore, the retainer 4 is in position unable to receive the external operating force and is thus held naturally. In this condition, the dual-mode two-way clutch 30 is in position to lock the rotation and, therefore, the seat back 34 cannot be tilted in either direction, i.e., forwards or rearwards, about the hinge axis.

Specifically, the engagement projections 9 of the retainer 4 are loosely engaged in the retainer fixing grooves 7A in the inner race 1 and, therefore, the retainer 4 can be freely rotatable relative to the outer race a slight distance corresponding to the size of gaps formed between the engagement projections 9A and the retainer fixing grooves 7A. For this reason, when the outer race 2 is rotated in any one of the opposite directions even a slight distance relative to the inner race 1, the slight rotation of the outer race 2 is accompanied by a corresponding rotation of the retainer 4 and, as a result thereof, the rolling elements 3 are displaced by the rotation of the retainer 4 to a shallow position in the cam faces 6 to thereby lock the inner and outer races 1 and 2 to prevent from being rotated relative to each other.

When the handle 16a is pulled upwards to turn the operating member 16A clockwise through a predetermined angle, for example, 45°, the first operating cam faces 17A of the operating lever 16A are engaged with the second cam faces 18A in the retainer 4 and, consequently, the retainer 4 are axially urged by the operating member 16A. In this way, the engagement projections 9 in the retainer 4 are firmly engaged in the corresponding retainer fixing grooves 7A in the inner race 1 wherefore the retainer 4 and the inner race 1 can be rotatable together therewith in a rotation synchronized fashion. For this reason, the rolling elements 3 retained in the respective pockets 8 in the retainer 4 are held and retained at the intermediate position of the associated cam faces 6 and, therefore, the frictional contact between the rolling element 3 and the inner peripheral surface of the outer race 2 diminishes to allow the dual-mode two-way clutch to be unlocked.

Accordingly, the seat back 34 can be tilted in either direction forwards or rearwards as desired. In such case, when the seat back 34 is desired to be tilted backwards, the seat occupant has to tilt his back to push the seat back 34, but when the seat back 34 is desired to be tilted forwards, the forward tilt of the seat back 34 takes place by the effect of the restoring force exerted by the spring member 35.

When the handle 16a is returned to the initial horizontal position after the position of the seat back 34 relative to the seat 33 has been fixed, the dual-mode two-way clutch 30 is held in position to lock the rotation and the seat back 34 is hence locked at that position.

With the seat back adjustment of the structure described above, the seat back 34 can be locked at any desired position between the folded and erected positions. Unlike the prior art seat back adjustment utilizing the ratchet mechanism, no obnoxious sounds will be generated which would occur as a result of incomplete engagement of toothed component parts of the ratchet mechanism. The seat back adjustment according to this embodiment of the present invention is effective to provide an appealing operativity and an appealing feature both having not been experienced with the prior art seat back adjustment.

It is to be noted that as a modified form of the dual-mode two-way clutch 30 employed in the seat back adjustment discussed above, the retainer 4 may be of the type receiving the radially inwardly acting external force, not the axially acting external force such as described above, to allow the clutch 30 to have one of the rotation locking function and the rotation unlocking function. In such case, the dual-mode two-way clutch 30 will be of the structure identical with that shown in and described with reference to FIGS. 8A and 8B.

Figure 21A:
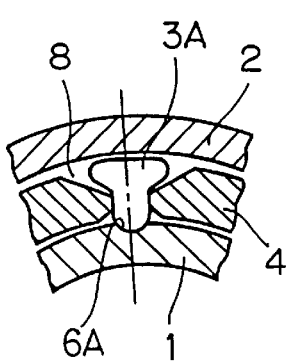
FIGS. 21A to 21C are fragmentary transverse sectional views of a portion of the seat back adjusting mechanism shown in FIG. 20, showing different operative positions, respectively.
Figure 21B:
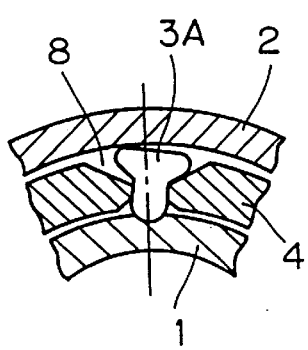
Figure 21C:
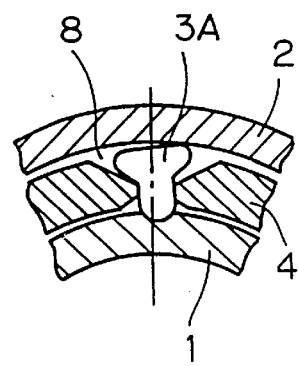

A fifth preferred embodiment of the present invention is shown in FIGS. 20 and 21A to 21C. In this embodiment, in place of the rolling elements 3 and the cam faces 6 both employed in the fourth embodiment of the present invention shown in and described with reference to FIGS. 19A and 19B, sprags 3A are employed. As shown therein, each of the sprags 3A is a generally elongated member of a generally T-shaped cross-section having a leg and a transverse body. The sprags 3A are positioned between the inner and outer races 1 and 2 with the leg of each the sprag 3A rockingly received in a corresponding fulcrum groove 6A of a generally semi-circular cross-section defined in the outer peripheral surface of the inner race 1. Each of the sprags 3A is laterally tiltable in one of two directions opposite to each other, i.e., left or right as shown in FIGS. 21C and 21B, respectively, to lock the inner and outer 1 and 2 relative to each other. The retainer 4 employed in the practice of this modification has pockets 8A equal in number to the number of the sprags 3A through which the respective legs of the sprags 3A extend and is constrained in phase synchronized relation with the inner race 1 by the guide means 14 including the retainer fixing grooves 7 and the engagement projections 9 as is the case with those shown in FIGS. 19A and 19B. Other component parts of the dual-mode two-way cutch shown in FIGS. 20 and 2A1 to 21C are substantially identical with those shown in FIGS. 19A and 19B.

Even in this modification, the inner race 1 and the outer race 2 are normally locked relative to each other by the sprags 3A from being rotated, but when the operating member 16A is manipulated, the inner race 1 and the outer race 2 can rotate relative to each other in any one of the opposite, forward and rearward directions. For this reason, in a lock released condition, the seat back 34 can be adjusted as desired between the folded and erected positions.

Figure 22:
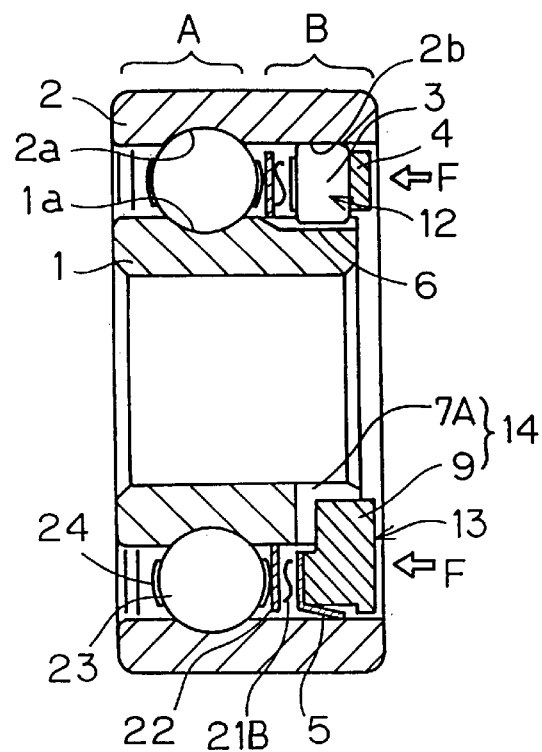
FIG. 22 is a longitudinal sectional view of a bearing assembly having the dual-mode two-way clutch built therein, according to a sixth preferred embodiment of the present invention.
Figure 23:
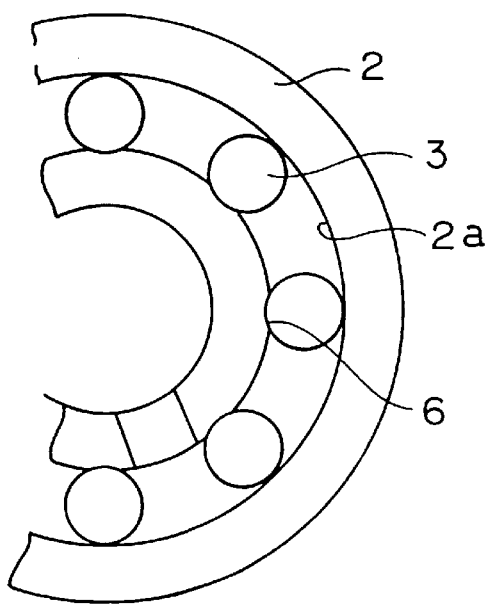
FIG. 23 is a fragmentary elevational view of the bearing assembly shown in FIG. 22.

FIGS. 22 to 26 illustrates a sixth preferred embodiment of the present invention which is directed to a bearing assembly equipped with the dual-mode two-way clutch, hereinafter referred to as a clutch-equipped bearing assembly. As shown in FIG. 22, the clutch-equipped bearing assembly is of a design wherein one end portion serves as a bearing unit A and the opposite end portion serves as a clutch B and comprises an inner race 1, an outer race 2, a plurality of rolling elements 23, a plurality of engagement elements 3, first and second retainers 24 and 4 for retaining the rolling elements 23 and the engagement elements 3, respectively, an elastic member 5 for imparting a friction, a return elastic member 21B, and an elastic member support 22. The engagement elements 3 are employed in the form of a rolling element such as, for example, a roller.

The rolling elements 23 used in the bearing unit A are in the form of a ball and are held in rolling contact with an inner raceway 1a, defined in one end portion of the outer peripheral surface of the inner race 1, and an outer raceway 2a defined in one end portion of the inner peripheral surface of the outer race 2 adjacent that one end of the outer peripheral surface of the inner race 1. Each of the inner and outer raceways 1a and 2a is in the form of a circumferentially extending groove of a generally arcuate cross-sectional shape.

Figure 24:
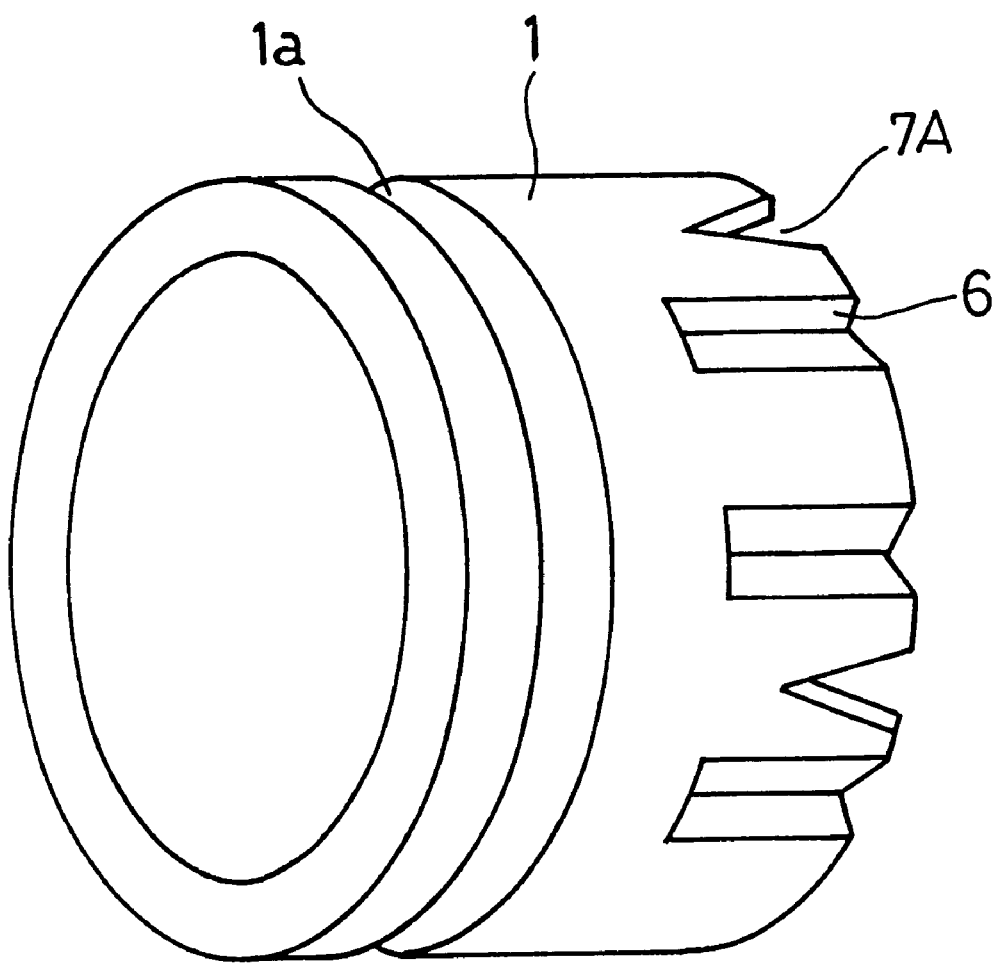
FIG. 24 is a perspective view of the bearing assembly shown in FIG. 22.

The opposite end portion of the outer peripheral surface of the inner race 1 is formed with a plurality of grooved cam faces 6 defined therein and spaced an equal distance from each other in a direction circumferentially of the inner race 1 as shown in FIG. 24. Each of these cam faces 6 has a cross-sectional shape substantially similar to that shown in FIG. 3A or 3B.

One end face of the inner race 1 adjacent the clutch unit B is formed with a plurality of axially inwardly recessed retainer fixing grooves 7A defined therein and spaced an equal distance from each other in a direction circumferentially of the inner race 1. These retainer fixing grooves 7A are formed, for example, so as to alternate with the cam faces 6 in the direction circumferentially of the inner race 1. Each of the retainer fixing grooves 7A is of a shape having a portion intermediate of the width thereof which is deepest in a direction axially inwardly thereof and is, in the illustrated embodiment, of a generally V-shaped configuration having oppositely inclined groove faces that are steep angled as compared with the cam faces 6.

It is to be noted that in the embodiment shown in FIGS. 22 to 26 the inner race 1 is of a cylindrical shape, but it may be comprised of a shaft. In other words, the shaft may have the raceway 1a, the cam faces 6 and the retainer fixing grooves 7 all formed directly on the shaft.

As shown in FIG. 22, the opposite end portion of the inner peripheral surface of the outer race 2 represents a cylindrical surface and defines a circumferentially extending outer raceway 2b along which the rolling elements 3 can roll in contact therewith. The outer raceway 2b in the outer race 2, the cam faces 6 in the inner race 1and the engagement elements 3 altogether constitute a lock means 12 for avoiding a relative rotation of the inner and outer races 1 and 2 in any one of the forward and rearward directions.

Figure 25:
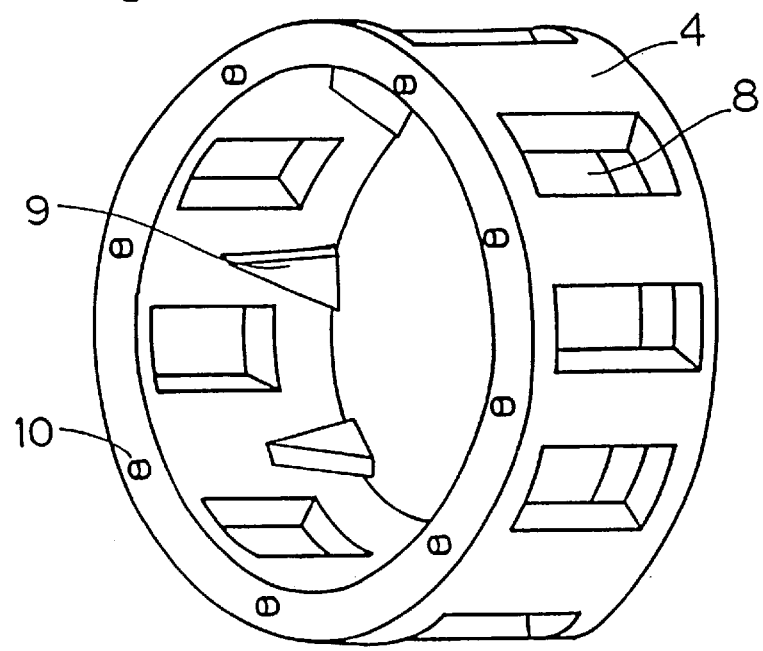
FIG. 25 is a perspective view of the retainer of the dual-mode two-way clutch employed in the bearing assembly of FIG. 22.
Figure 26:
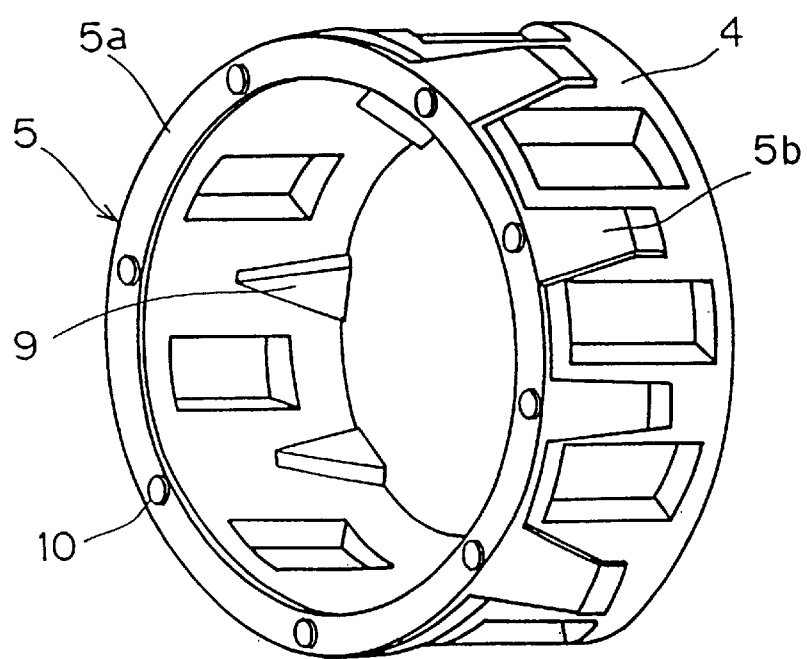
FIG. 26 is a perspective view of the retainer shown in FIG. 25, which is provided with the elastic member.

The retainer 4 in the clutch unit B is best shown in FIGS. 25 and 26. This retainer 4 is similar to that shown in FIGS. 13 and 14, but differs therefrom in that in the retainer 4 shown in FIGS. 25 and 26 no collar such as that indicated by 19 in FIGS. 13 and 14 is employed and each of the engagement projections 9A is of a size larger than that shown in FIGS. 13 and 14. Other component parts of the retainer 14 shown in FIGS. 25 and 26 are substantially identical with those shown in FIGS. 13 and 14. The engagement projection 9A are formed, for example, integrally with the inner peripheral surface of the retainer 4 and positioned at one end thereof remote from the bearing unit A. Each of those engagement projections 9A is in the form of a generally triangular projection protruding radially inwardly of the retainer 4 and tapering in a direction axially inwardly of the retainer 4.

The return elastic member 21B shown in FIG. 22 is used to urge the retainer 4 axially outwardly towards the end of the outer race 2 remote from the bearing unit A and is positioned between the elastic member support 22, in the form of a ring plate supported by the inner race 1 at a location between the bearing unit A and the clutch unit B, and the retainer 4. For the return elastic member 21B, a leaf spring or a wire spring may be employed. The elastic member support 22 may be press-fitted into the bore with its periphery firmly engaged with the outer peripheral surface of the inner race 1 to support a reactive force of the return elastic member 21.

With this clutch-equipped bearing assembly, not only can a function of the rolling bearing be obtained through the rolling elements 23, but a function of a novel clutch similar to that described in connection with the fourth embodiment of the present invention with reference to FIGS. 19A and 19B can also be obtained.

More specifically, in this clutch-equipped bearing assembly, when the external force F is applied to the retainer 4, the inner and outer races 1 and 2 can rotate relative to each other in any one of the forward and rearward directions, but when the application of the external force F is released from the retainer 4, the inner and outer races 1 and 2 can be locked in position without being rotatable relative to each other. For this reason, the clutch-equipped bearing assembly can be used as a bearing in conjunction with the wheeled cart or the sliding door and, where it is so used, the wheeled cart or door can be brought to a halt immediately after the force applied to the cart or the door, which corresponds to the external force F referred to above, is released from the cart or the door, to thereby secure a safety factor.

Figure 27:
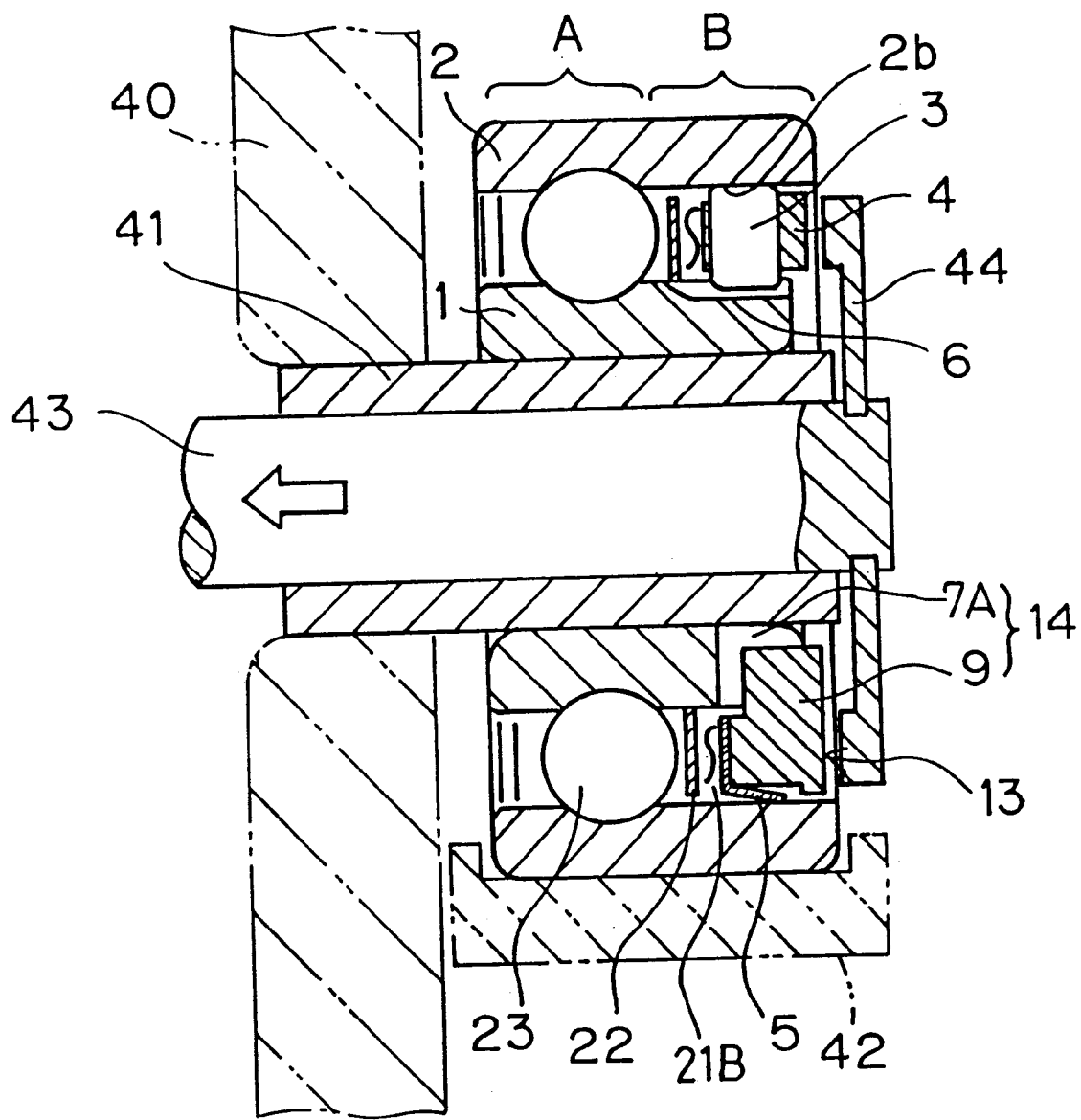
FIG. 27 is a fragmentary sectional view showing a door support system utilizing the bearing assembly having the dual-mode two-way clutch built therein.
Figure 28:
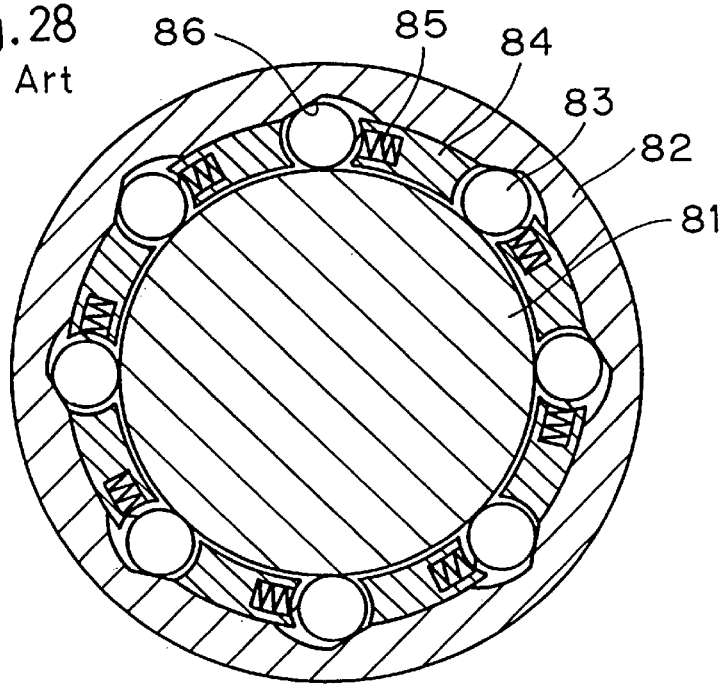
FIG. 28 is a transverse sectional view of the prior art one-way clutch.
Figure 29:
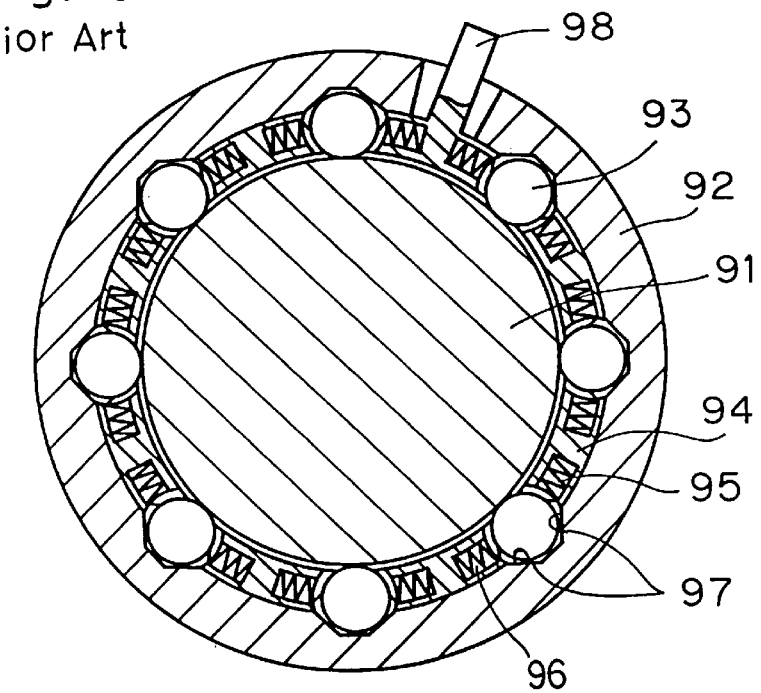
FIG. 29 is a transverse sectional view of the prior art two-way clutch.

Application of the clutch-quipped bearing assembly to the automobile sliding door is shown in FIG. 27. Specifically, FIG. 27 illustrates an automobile door support system for slidably supporting the door while the latter is suspended above. In applying the clutch-equipped bearing assembly of the present invention to the automobile door support system, the inner race 1 of the clutch-equipped bearing assembly is fixedly mounted on a stud shaft 41 that is fixedly provided in the door 40 so as to extend laterally outwardly therefrom, while the outer race 2 of the same clutch-equipped bearing assembly is mounted on a rail 42 fast with an automobile body structure. The stud shaft 41 is in the form of a sleeve and includes an operating rod 43 extending therethrough. One end of the operating rod 43 outwardly of the clutch-equipped bearing assembly is provided with an external force applying member 44 mounted thereon in face-to-face relation with the retainer 4 of the clutch-equipped bearing assembly, whereas the opposite end of the operating rod 43 remote from the clutch-equipped bearing assembly is coupled with an operating member such as, for example, a knob (not shown).

According to the clutch-quipped bearing assembly so applied to the sliding door, when the sliding door 40 is desired to be selectively opened and closed, the sliding door 40 has to be manually moved, i.e., slid while the operating rod 43 is axially pulled in a direction shown by the arrow to apply the external force to the retainer 4 through the external force applying member 44. Specifically, as the external force is applied to the retainer 4 through the external force applying member 44, the clutch-equipped bearing assembly is unlocked to permit the sliding door 40 to be freely movable. On the other hand, if the operating rod 43 is released, the retainer 4 returns automatically to the original position as biased by the biasing force of the return elastic member 21B and, therefore, the clutch-equipped bearing assembly is locked to prevent the sliding door 40 from being moved.

It is to be noted that the clutch unit B of the clutch-equipped bearing assembly may be of a structure similar to the dual-mode two-way clutch shown in and described with reference to FIGS. 20 and 21A to 21C in which the sprags are employed.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, although in any one of the foregoing embodiments the rolling elements 3 have been used as the engagement elements that engage the cam faces 6, the engagement elements of a non-circular cross-section may be employed in place of the rolling elements. Also, although in any one of the foregoing embodiments the cam faces 6 have been formed in the inner race 1 and the circumferential raceway 2a has been formed in the outer race 2, the disposition may not be always limited thereto and the circumferential raceway may be formed in the inner race 1 and the cam faces may be formed in the outer race 2.

In addition, instead of the inner and outer races 1 and 2 employed in any one of the foregoing embodiments of the present invention, first and second members which are axially oriented with each other may be employed, in which case the cam faces and the circumferential raceways are opposed axially with respect to each other.

Accordingly, such changes and modifications are, unless they depart from the scope of the present invention as delivered from the claims annexed hereto, to be construed as included therein.

What is claimed is:

1. A seat back adjustment for a seat assembly including a seat and a seat back coupled with the seat and tiltable between folded and erected positions relative to the seat, said seat back adjustment comprising;

fixed and movable frames adapted to be rigidly secured to the seat and seat back, respectively;

a clutch including an inner race and an outer race, one of said inner and outer races being fixedly connected to the fixed frame and the other of said inner and outer races being fixedly connected to the movable frame, said inner and outer races being rotatable relative to each other in any one of first and second directions opposite to each other; and said clutch also including a lock means for locking the relative rotation of the inner and outer races in any one of the first and second directions by means of a frictional contact, a lock release means for releasing the lock means to allow the inner and outer races to be rotatable in any one of the first and second directions relative to each other when a predetermined external force is applied thereto, and an operating member for applying the external force.

2. The seat back adjustment as claimed in claim 1, wherein said lock means includes a circumferentially extending raceway defined in one of an outer peripheral surface of the inner race and an inner peripheral surface of the outer race, a plurality of circumferentially spaced cam faces defined in the other of the outer peripheral surface of the inner race and the inner peripheral surface of the outer race so as to confront the circumferentially extending raceway and a plurality of rolling elements interposed between the circumferentially extending raceway and the cam faces;

wherein each of the cam faces being formed to have a maximum depth at a position intermediate thereof while the depth of the respective cam face is progressively reducing on both sides thereof such that when the rolling elements are displaced in either direction from the intermediate position of the associated cam faces, the relative rotation of the inner and outer races are locked; and wherein said lock release means includes a retainer having a plurality of pockets defined therein for accommodating the respective rolling elements in a manner to prevent the rolling elements from displacing in a direction circumferentially thereof, and a guide means for fixedly coupling the retainer to one of the inner and outer races where the cam faces are formed, to allow the rolling elements to be brought to the intermediate position in the cam faces when the external force is applied.

3. The seat back adjustment as claimed in claim 2, wherein said guide means comprises a plurality of retainer fixing grooves defined in one of the inner or outer race in which the cam faces are formed and the retainer, and a corresponding number of engagement projections defined in the other of the inner or outer race and the retainer, said engagement projections being loosely engaged in the respective retainer fixing grooves so long as no predetermined external force is applied to the retainer, but tightly engaged in the respective retainer fixing grooves when the predetermined external force is applied to the retainer, and further comprising at least one elastic member applying a frictional force between one of the inner and outer races where the circumferentially extending raceway is formed and the retainer.

4. The seat back adjustment as claimed in claim 3, wherein the inner race is fixed to the fixed frame and the outer race is fixed to the movable frame, said fixed frame having a stud shaft fixed thereto in coaxial relation with the outer race; wherein the operating member is rotatably supported by the stud shaft in coaxial relation with the inner race with the engagement projections engageable in the retainer fixing grooves, and further comprising operating cam faces defined in the operating member and the retainer for applying an axially acting force, which serve the predetermined external force, to the retainer as the operating member is turned.

5. The seat back adjustment as claimed in claim 4, further comprising a return elastic member for urging the operating member in a direction away from the retainer.

6. The seat back adjustment as claimed in claim 1, wherein said lock means comprises a plurality of rocking sprags provided in one of the outer peripheral surface of the inner race and the inner peripheral surface of the outer race for rocking motion in a direction circumferentially of any one of the inner and outer races, and a cylindrical sprag contact surface defined in the other of the outer peripheral surface of the inner race and the inner peripheral surface of the outer race, said sprags, when held at a neutral angle, being disengaged from the sprag contact surface to permit the relative rotation between the inner and outer races, but said sprags being, when tilted in either direction circumferentially of any one of the inner and outer races, frictionally engaged with the sprag contact surface to lock the relative rotation between the inner and outer races, and wherein said lock release means is operable to selectively positioning the sprags between a first position, in which the sprags assume the neutral angle, and a second position in which the sprags are free to tilt.

7. A bearing assembly equipped with a clutch, which comprises:

a rolling bearing comprising an inner race, an outer race and a plurality of rolling elements interposed between the inner race and the outer race; and a clutch having component parts constituted by the inner race and the outer race and including a lock means for locking the relative rotation of the inner and outer races in any one of first and second directions opposite to each other by means of a frictional contact, and a lock release means for releasing the lock means to allow the inner and outer races to be rotatable in any one of the first and second directions relative to each other when a predetermined external force is applied thereto.

8. The bearing assembly equipped with the clutch as claimed in claim 7, wherein the lock means includes a circumferentially extending raceway defined in one of an outer peripheral surface of the inner race and an inner peripheral surface of the outer race, a plurality of circumferentially spaced cam faces defined in the other of the outer peripheral surface of the inner race and the inner peripheral surface of the outer race so as to confront the circumferentially extending raceway and a plurality of engagement elements interposed between the circumferentially extending raceway and the cam faces;

wherein each of the cam faces being formed to have a maximum depth at a position intermediate thereof while the depth of the respective cam face is progressively reducing on both sides thereof such that when the engagement elements are displaced in either direction from the intermediate position of the associated cam faces, the relative rotation of the inner and outer races are locked; and wherein said lock release means includes a retainer having a plurality of pockets defined therein for accommodating the respective engagement elements in a manner to prevent the engagement elements from displacing in a direction circumferentially thereof, and a guide means for fixedly coupling the retainer to one of the inner and outer races where the cam faces are formed, to allow the engagement elements to be brought to the intermediate position in the cam faces when the external force is applied.

9. The bearing assembly equipped with the clutch as claimed in claim 8, wherein said guide means comprises a plurality of retainer fixing grooves defined in one of the inner or outer race in which the cam faces are formed and the retainer, and a corresponding number of engagement projections defied in the other of the inner or outer race and the retainer, said engagement projections being loosely engaged in the respective retainer fixing grooves so long as no predetermined external force is applied to the retainer, but tightly engaged in the respective retainer fixing grooves when the predetermined external force is applied to the retainer, and further comprising at least one elastic member applying a frictional force between one of the inner and outer races where the circumferentially extending raceway is formed and the retainer.

* * * * *